United States Patent
Wang et al.

(10) Patent No.: US 12,519,707 B2
(45) Date of Patent: Jan. 6, 2026

(54) ARCHITECTURE FOR MONITORING METRICS OF NETWORK MANAGEMENT SYSTEM

(71) Applicant: VMware LLC, Palo Alto, CA (US)

(72) Inventors: Ziyou Wang, Beijing (CN); Wenyu Zhang, Beijing (CN); Minjal Agarwal, Santa Clara, CA (US); Qiong Wang, Beijing (CN); Yuanhui Wang, Beijing (CN); Donghai Han, Beijing (CN)

(73) Assignee: VMware LLC, Palo Alto, CA (US)

( * ) Notice: Subject to any disclaimer, the term of this patent is extended or adjusted under 35 U.S.C. 154(b) by 157 days.

(21) Appl. No.: 18/231,756

(22) Filed: Aug. 8, 2023

(65) Prior Publication Data
US 2025/0016074 A1 Jan. 9, 2025

(51) Int. Cl.
*H04L 43/04* (2022.01)
*H04L 41/046* (2022.01)

(52) U.S. Cl.
CPC ........... *H04L 43/04* (2013.01); *H04L 41/046* (2013.01)

(58) Field of Classification Search
CPC .............................. H04L 43/04; H04L 41/046
See application file for complete search history.

(56) References Cited

U.S. PATENT DOCUMENTS

| | | | | |
|---|---|---|---|---|
| 7,467,192 B1 * | 12/2008 | Lemler | ................ | H04L 41/5006 709/224 |
| 2011/0225299 A1 * | 9/2011 | Nathuji | ................ | G06F 9/45558 718/1 |
| 2015/0288746 A1 * | 10/2015 | Clarke | ................. | G06F 11/3419 709/202 |
| 2019/0222988 A1 * | 7/2019 | Maes | ................... | H04L 41/5054 |
| 2021/0218750 A1 * | 7/2021 | Wells | .................... | H04L 63/105 |
| 2021/0373924 A1 * | 12/2021 | Sivaraman | .............. | G06F 9/505 |
| 2023/0127722 A1 * | 4/2023 | Ibanez | ................... | G06F 9/5016 719/318 |
| 2023/0244466 A1 * | 8/2023 | Shah | ......................... | G06F 8/63 717/178 |

* cited by examiner

*Primary Examiner* — Minh Chau Nguyen
(74) *Attorney, Agent, or Firm* — Quarles & Brady LLP

(57) ABSTRACT

Some embodiments provide a method for monitoring a multi-tenant network management system deployed in a cloud to manage groups of datacenters. The network management system includes multiple groups of service instances. For each respective group of service instances deployed in the cloud to manage a respective datacenter group, the method deploys a metrics collection agent within each service instance of the group of service instances to collect metrics from services of the service instance and provide the collected metrics to a metric monitoring service instance of the group of service instances. For each respective group of service instances, the method deploys a metrics collection manager within the metric monitoring service instance of the group of service instances. The metrics collection manager is for configuring each of the metrics collection agents deployed within the service instances of the group of service instances.

24 Claims, 14 Drawing Sheets

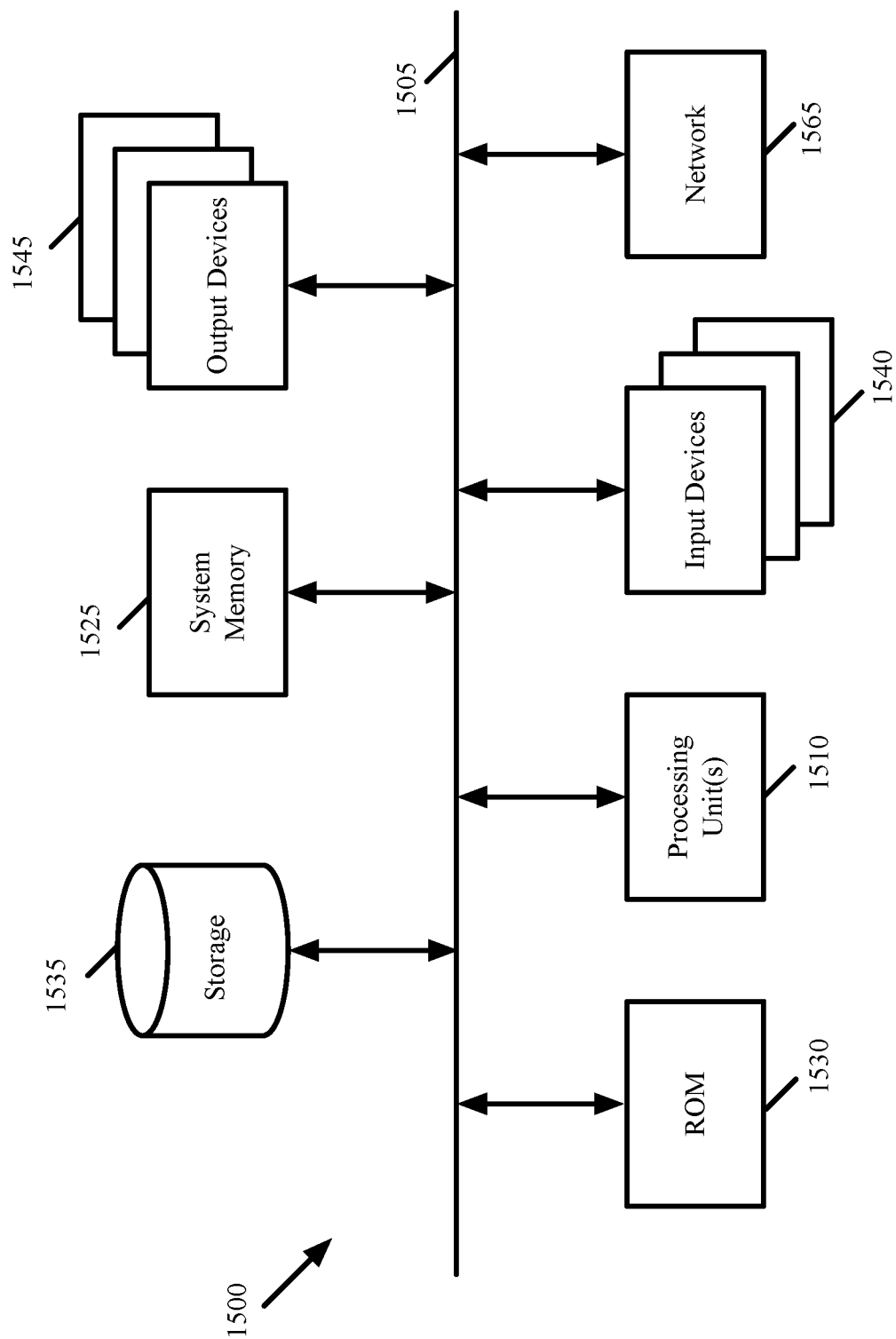

ARCHITECTURE FOR MONITORING METRICS OF NETWORK MANAGEMENT SYSTEM

BACKGROUND

Metrics monitoring is important for maintaining resiliency and ensuring continuous operation of any system, and especially SaaS systems. As various services (e.g., network management) move into microservices-based systems in the cloud, the framework for monitoring these systems needs to adapt. Such a metrics monitoring framework needs to be flexible enough to adapt to system architecture changes as well as scale with a large number of tenants (as compared to an on-premises network management system that only manages a single datacenter or group of datacenters). While toolkits exist for monitoring aspects of Kubernetes clusters, these systems do not scale well, either because they are fully centralized (and thus cannot easily accommodate many tenants) or because they are not adaptable on-the-fly to system changes. As such, more improved metrics collection and monitoring is needed.

BRIEF SUMMARY

Some embodiments provide a novel architecture for monitoring metrics (e.g., to determine health status, identify problems, and trigger alarms) for a multi-tenant system that is deployed as a set of service instances executing across one or more datacenters. The service instances are grouped for each tenant, and a metrics collection agent is deployed in each service instance to collect metrics from the services of its respective service instance. In addition, each group of service instances includes a metrics monitoring service instance that includes a service or services for analyzing collected metrics. The metrics collection agents for each service instance in a group (including the metrics monitoring service) send their collected metrics to the group's metrics monitoring service for analysis. Furthermore, the architecture includes a metrics collection manager within each group of service instances for configuring the metrics collection agents of that service instance group. The metrics collection manager, in some embodiments, is deployed within the metrics monitoring service.

In some embodiments, the monitored system is implemented within a container cluster (e.g., a Kubernetes cluster) in a public cloud (e.g., across one or more public cloud datacenters). For instance, in some embodiments, the monitored system is a multi-tenant network management system that executes in the public cloud to manage groups of datacenters (e.g., on-premises datacenters, virtual datacenters implemented in the same or other public clouds, etc., or a combination thereof) for multiple different tenants. Such a multi-tenant network management system, in some embodiments, includes both (i) a set of common multi-tenant services and (ii) multiple tenant-specific service instances that each perform a specific set of network management operations for a single group of datacenters of a single tenant. For instance, the common multi-tenant services could include a subscription service, a registration service, a deployment service that handles deployment of the tenant-specific service instances, among other services.

In some embodiments, the tenant-specific service instances include policy management service instances, network flow monitoring service instances, load balancing service instances, etc. As noted above, these service instances are organized as groups of service instances. In some embodiments, each group of service instance group includes one or more service instances that all manage the same group of datacenters for a particular tenant. Different groups of service instances may include different types of service instances, depending on the preferences of the tenant that defines the datacenter group with the network management system. Each service instance, therefore, manages a single group of datacenters for a single tenant. In other embodiments, a single service instance may manage multiple groups of datacenters (for the same tenant or for different tenants).

Each of these service instances, in some embodiments, is implemented as a set of microservices. That is, the different functions of a given service instance are performed by different microservices in some embodiments, with different types of service instances having different individual microservices. In some embodiments, each of the service instances is assigned a different namespace in the container cluster, with all of the services that make up a given service instance deployed to that service instance's namespace. In addition, some embodiments deploy the metrics collection agent for each service instance to that service instance's namespace, thereby allowing the metrics collection agent to communicate with the services of its service instance without the need to define any special rules for communication across namespaces.

In some embodiments, the network management system also deploys, as part of each group of service instances, a metric monitoring service instance. Whereas the other service instances in the group interact with the datacenters managed by that group of service instances (i.e., to perform various different monitoring functions), the metric monitoring service instance monitors the metrics of the various service instances in the group. It should be noted that in some embodiments the metric monitoring service also monitors the metrics of various network control system components in the managed datacenters with which the other services interact (e.g., local network managers at each of the datacenters).

The metrics collection agents deployed to the various service instances in a group collect metrics from the services of their respective service instances and report these metrics to the metric monitoring service instance of their group. This includes the metrics collection agent deployed within the metric monitoring service instance. In addition, in some embodiments the metrics collection agents report their own metrics to the metric monitoring service instance as well. In some embodiments, a specific microservice within the metric monitoring service instance (e.g., implemented as one or more Pods) is the recipient of these collected metrics and performs analysis on the metrics (e.g., in order to trigger alarms when anomalous metrics are discovered). The metrics collection agent for the metric monitoring service also collects metrics from this microservice (and then provides these metrics to the microservice so that the microservice analyzes its own metrics as well).

Deployed within the metric monitoring service instance, in some embodiments, is a metrics collection manager that allows for individualized configuration of the metrics collection performed by the collection agents. The metrics collection agents for a group of service instances register with the metrics collection manager when they are deployed and the metrics collection manager establishes a management (e.g., RPC) channel with each metrics collection agent. Through this channel, the metrics collection manager can synchronize configuration with the metrics collection agents (e.g., specifying the types of metrics to collect, how often to collect metrics from the different services, etc.). In some embodiments, these configuration details can be specified by the tenant to whom the service instance group belongs by the tenant accessing the metrics collection manager (e.g., via an ingress routing function of the container cluster). In some embodiments, the metrics collection manager also enables the tenant to view the metrics of the different services instances that manage their datacenter group.

In some embodiments, the metrics collection manager is deployed in the namespace of the metric monitoring service instance. In other embodiments, the metrics collection manager is deployed in a common namespace (e.g., a namespace used by the multi-tenant services or a common namespace for the service instance group) rather than that of any specific service instance. The latter option, in some embodiments, enables easier communication with all of the metrics collection agents in the service instance group (based on firewall rules enforced by the container cluster networking infrastructure).

The above description relates to monitoring the metrics of the various tenant-specific service instances. Some embodiments also monitor the metrics of the multi-tenant services as well. To perform this monitoring, the architecture is expanded to include, in the common namespace, (i) a metrics collection agent that collects metrics from the various multi-tenant services, (ii) a metrics collection manager for managing that metrics collection agent, and (iii) a metrics monitoring service that performs similar operations to the metrics monitoring services of each service instance group. In this case, the metrics monitoring service receives the collected metrics from the common metrics collection agent in order to analyze these metrics. Furthermore, some embodiments include a central metrics manager that communicates with the metrics collection manager for the multi-tenant services as well as the metrics collection managers for all of the service instance groups. The central metrics manager allows the provider of the network management system to centrally access metrics data and/or metrics collection configuration for the multi-tenant services as well as the various service instance groups in some embodiments.

In order to collect the metrics from the various services within its service instance, a metrics collection may use different techniques for different services. For some services, the metrics collection agent contacts an application programming interface (API) exposed by the service at regular intervals, with the service responding to these API calls by providing the metrics to the metrics collection agent. In different embodiments, these APIs exposed by the services may be http APIs, gRPC APIs, other types of APIs, or a combination thereof. In some embodiments, the metrics collection manager configures the metrics collection agent to specify (i) from which services metrics should be collected and (ii) which metrics should be collected from each of these services.

Other services cannot be regularly contacted by the metrics collection agent. For instance, for some services metrics are only available when a job is actually running. These services provide metrics in a push manner in some embodiments. Prior to providing any metrics (e.g., upon startup of the service), a metrics collection client operating within the service notifies the metrics collection agent of the names of metrics that it will provide. The metrics collection client then pushes these metrics to the collection agent. In some embodiments, a tenant can specify, via the metrics collection manager, whether specific metrics should be pushed to the metrics collection agent.

For either type of metrics collection, in some embodiments the metrics are provided to the metrics collection agent in a uniform format. Specifically, some embodiments use a protocol buffer (protobuf) message format. In some such embodiments, each individual metric that a service provides to the metrics collection agent is a separate protobuf message, and each time the service provides the metrics to the metrics collection agent the service sends the messages as a group (e.g., a message bag). The metrics collection receives the message group and sends the metrics to the metric monitoring service as individual protobuf messages in some embodiments. Other embodiments use other message formats to provide the metrics to the metrics collection agent, such as JSON (JavaScript Object Notation), yaml (yaml ain't markup language), or xml (extensible markup language).

In some embodiments, the types of metrics collected can include both statistics metrics and status metrics. For example, statistics metrics can include such metrics as the API response time (e.g., average time) for a particular API call, memory and/or CPU usage, and execution time for a specific process or RPC call. Status metrics, on the other hand, specify whether a process or component is operating correctly, whether a connection is available, etc. In some embodiments, the metrics collection agent forwards all collected statistics metrics to the metric monitoring service. However, for status metrics, the metrics collection agent compares the received value to the previous value for the status metric and only forwards the metric to the metric monitoring service if the value has changed.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 15 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel architecture for monitoring metrics (e.g., to determine health status, identify problems, and trigger alarms) for a multi-tenant system that is deployed as a set of service instances executing across one or more datacenters. The service instances are grouped for each tenant, and a metrics collection agent is deployed in each service instance to collect metrics from the services of its respective service instance. In addition, each group of service instances includes a metrics monitoring service instance that includes a service or services for analyzing collected metrics. The metrics collection agents for each service instance in a group (including the metrics monitoring service) send their collected metrics to the group's metrics monitoring service for analysis. Furthermore, the architecture includes a metrics collection manager within each group of service instances for configuring the metrics collection agents of that service instance group. The metrics collection manager, in some embodiments, is deployed within the metrics monitoring service.

In some embodiments, the monitored system is implemented within a container cluster (e.g., a Kubernetes cluster) in a public cloud (e.g., across one or more public cloud datacenters). For instance, in some embodiments, the monitored system is a multi-tenant network management system that executes in the public cloud to manage groups of datacenters (e.g., on-premises datacenters, virtual datacenters implemented in the same or other public clouds, etc., or a combination thereof) for multiple different tenants. Such a multi-tenant network management system, in some embodiments, includes both (i) a set of common multi-tenant services and (ii) multiple tenant-specific service instances that each perform a specific set of network management operations for a single group of datacenters of a single tenant. For instance, the common multi-tenant services could include a subscription service, a registration service, and a deployment service that handles deployment of the tenant-specific service instances, among other services.

Figure 1:
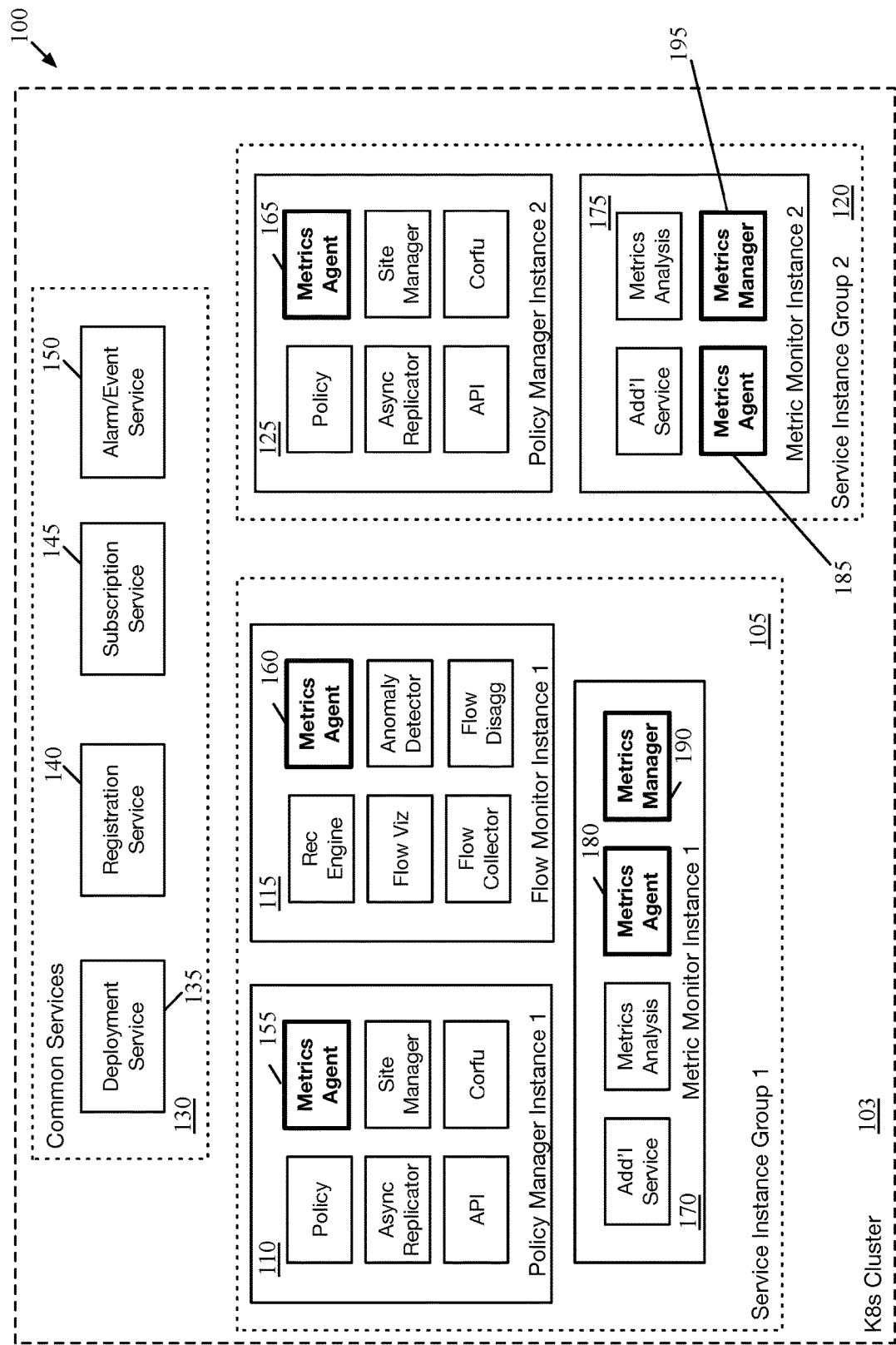
FIG. 1 conceptually illustrates the architecture of a cloud-based multi-tenant network management and monitoring system of some embodiments.

FIG. 1 conceptually illustrates the architecture of such a cloud-based multi-tenant network management and monitoring system 100 (subsequently referred to herein as a network management system) of some embodiments. In some embodiments, the network management system 100 operates in a container cluster (e.g., a Kubernetes cluster 103, as shown). The network management system 100 manages multiple groups of datacenters for multiple different tenants. For each group of datacenters, the tenant to whom that group of datacenters belongs selects a set of network management services for the network management system to provide (e.g., policy management, network flow monitoring, threat monitoring, etc.). In addition, in some embodiments, a given tenant can have multiple datacenter groups (for which the tenant can select to have the network management system provide the same set of services or different sets of services). Additional information regarding these datacenter groups can be found in U.S. patent application Ser. No. 18/195,835, which is incorporated herein by reference.

In some embodiments, each network management service for each datacenter group operates as a separate service instance in the container cluster 103, with these service instances grouped based on the group of datacenters that the service instances manage. In this example, both a policy management service and a network flow monitoring service have been defined for a first datacenter group, and thus the cluster 103 includes a first service instance group 105 with both a first policy manager instance 110 and a flow monitoring instance 115. In addition, only a policy management service has been defined for a second datacenter group and thus the cluster 103 also includes a second service instance group 120 with a second policy manager instance 125.

The policy management service for a given datacenter group, in some embodiments, allows the user to define a logical network for the datacenter group that connects logical network endpoint data compute nodes (DCNs) (e.g., virtual machines, containers, etc.) operating in the datacenters as well as various policies for that logical network (defining security groups, firewall rules, edge gateway routing policies, etc.). Operations of the policy manager (in a non-cloud-based context) are described in detail in U.S. Pat. Nos. 11,088,919, 11,381,456, and 11,336,556, all of which are incorporated herein by reference. The flow monitoring service, in some embodiments, collects flow and context data from each of the datacenters in its datacenter group, correlates this flow and context information, and provides flow statistics information to the user (administrator) regarding the flows in the datacenters. In some embodiments, the flow monitoring service also generates firewall rule recommendations based on the collected flow information (e.g., using micro-segmentation) and publishes these firewall rules to the datacenters. Operations of the flow monitoring service are described in greater detail in U.S. Pat. No. 11,340,931, which is incorporated herein by reference. It should be understood that, while this example (and the other examples shown in this application) only describe a policy management service and a network flow monitoring service, some embodiments include the option for a user to deploy other services as well (e.g., a threat monitoring service, a load balancer service, etc.).

The network management system 100 as implemented in the container cluster 103 also includes various common (multi-tenant) services 130, as well as cluster controllers (e.g., Kubernetes controllers, which are not shown). These common services 130 are services that are part of the network management system but unlike the service instances are not instantiated separately for each different group of datacenters. Rather, the common services 130 interact with all of the tenant users, all of the datacenter groups, and/or all of the service instances. These services do not store data specific to the network policy or network operation for an individual user or datacenter group, but rather handle high-level operations to ensure that the network management services can properly interact with the users and datacenters.

For instance, the deployment service 135, in some embodiments, enables the creation of the various network management service instances 105, 110, and 125, as well as the metric monitor instances discussed below. In some embodiments, the deployment service 135 is a multi-tenant service that is accessed by (or at least used by) all of the tenants of the network management system. Through the deployment service, a tenant can define a datacenter group and specify which network management services should be implemented for the datacenter group. In addition, within a datacenter group, in some embodiments the deployment service 135 allows a tenant to define sub-tenants for the group.

The registration service 140 of some embodiments performs a set of operations for ensuring that physical datacenters can register with the network management service. The registration service 130 also keeps track of all of the different datacenters for each datacenter group, in some embodiments. The subscription service 145 of some embodiments handles subscription operations. The network management system of some embodiments uses a keyless licensing system; in some embodiments, the subscription service 145 swaps out licenses for datacenters that previously used a key-based licensing mechanism for an on-premises network management system. The alarm and event service 150 of some embodiments handles the raising of alarms when various types of issues are detected within the network management system 100. It should be understood that the common services 130 illustrated in this figure are not an exhaustive list of the common services of a network management system of some embodiments.

In some embodiments, each of the network management service instances 110, 115, and 125 of the network management system is implemented as a group of microservices. For instance, in a Kubernetes environment, in some embodiments each of the microservices is implemented in an individual Pod or set of redundant Pods. Each of the network management service instances 105-115 includes multiple microservices that perform different functions for the network management service. For instance, each of the policy manager instances 110 and 125 includes a policy microservice (e.g., for handling the actual policy configuration for the logical network spanning the datacenter group), a Corfu microservice (e.g., a Corfu database service that stores network policy configuration via a log), an asynchronous replication microservice (e.g., for executing asynchronous replication channels that push configuration to each of the datacenters managed by the policy management service), an API microservice (e.g., for handling API requests from users to modify and/or query for policy), and a site manager microservice (e.g., for managing the asynchronous replication channels).

The flow monitor instance 115 includes a recommendation microservice (e.g., for generating firewall rule recommendations based on micro-segmentation), a flow collector microservice (for collecting flows from the datacenters in the datacenter group monitored by the flow monitor instance 110), a flow disaggregation microservice (e.g., for de-duplicating and performing other aggregation operations on the collected flows), an anomaly detection microservice (e.g., for analyzing the flows to identify anomalous behavior), and a flow visualization microservice (e.g., for generating a UI visualization of the flows in the datacenters). It should be understood that these are not necessarily exhaustive lists of the microservices that make up the policy management and flow monitoring service instances, as different embodiments may include different numbers and types of microservices. In addition, a metrics collection agent 155-165 is deployed to each of the service instances 110, 115, and 125. The metrics collection agents 155-165, which will be discussed in detail below, collect metrics from the services of their respective service instances.

The common services 130 are also implemented as microservices in the container cluster 103 in some embodiments. In some embodiments, each of the common services is a microservice that is implemented in a Pod or a set of redundant Pods. In some other embodiments, some or all of the individual common services 135-150 is a group of microservices (like the service instances), with different microservices performing different functions for a given common service.

In some embodiments, the network management system also deploys, as part of each group of service instances 105 and 120, metric monitoring instances 170 and 175. In some embodiments, the metric monitoring instances 170 and 175 are deployed automatically upon the deployment of a group of service instances. In other embodiments, the metric monitoring instances 170 and 175 are only deployed based on specification by the tenant user when defining the set of services instances for managing a datacenter group (i.e., in the same manner as the policy manager instance, flow monitoring instance, etc.).

Like the other service instances, the metric monitoring instances 170 and 175 are implemented as groups of microservices. For instance, each metric monitoring instance includes at least a metrics analysis service that receives metrics from the metrics collection agents for the service instances in its group of services and analyzes these metrics (e.g., to detect anomalies and raise alarms if needed). In some embodiments, the metrics monitoring instance also includes a query server, API server, time series database, and point in time database. In some embodiments, a user (e.g., the tenant user that defines the datacenter group and specifies the services for that datacenter group) can access their metric monitoring instance in order to view the metrics (and run queries on these metrics) for the various monitored service instances. In some embodiments, the metrics analysis service can raise alarms based on analysis of the metrics (e.g., if resource usage is too high, if processes are taking too long to run or respond, if connections go offline, etc.) and provide these to the user via a user interface.

Whereas the other service instances in a group interact with the datacenters managed by that group of service instances (i.e., to perform various different network management functions), the metric monitoring instances 170 and 175 monitor the metrics of the various service instances in the group. It should be noted that in some embodiments the metric monitoring instance for a group of service instances also monitors the metrics of various network control system components in the managed datacenters with which the other service instances interact (e.g., local network managers at each of the datacenters).

Just as metrics collection agents 155-165 are deployed within the policy manager instances 110 and 125 as well as the flow monitoring instance 115, the system deploys metrics collection agents 180 and 185 to the metric monitoring instances 170 and 175. These metrics collection agents 180 and 185 collect metrics from the services of their respective metric monitoring instances and report these metrics to the metrics analysis service of their metric monitoring instance.

Also deployed within each metric monitoring service instance 170 and 175 is a respective metrics collection manager 190 and 195. The metrics collection manager for a group of service instances allows for individualized configuration of the metrics collection performed by the metrics collection agents deployed within that group of service instances. That is, the metrics collection manager 190 is used to configure the metrics collection agents 155, 160, and 180, while the metrics collection manager 195 is used to configure the metrics collection agents 165 and 185. The metrics collection managers will also be discussed in greater detail below.

Figure 2:
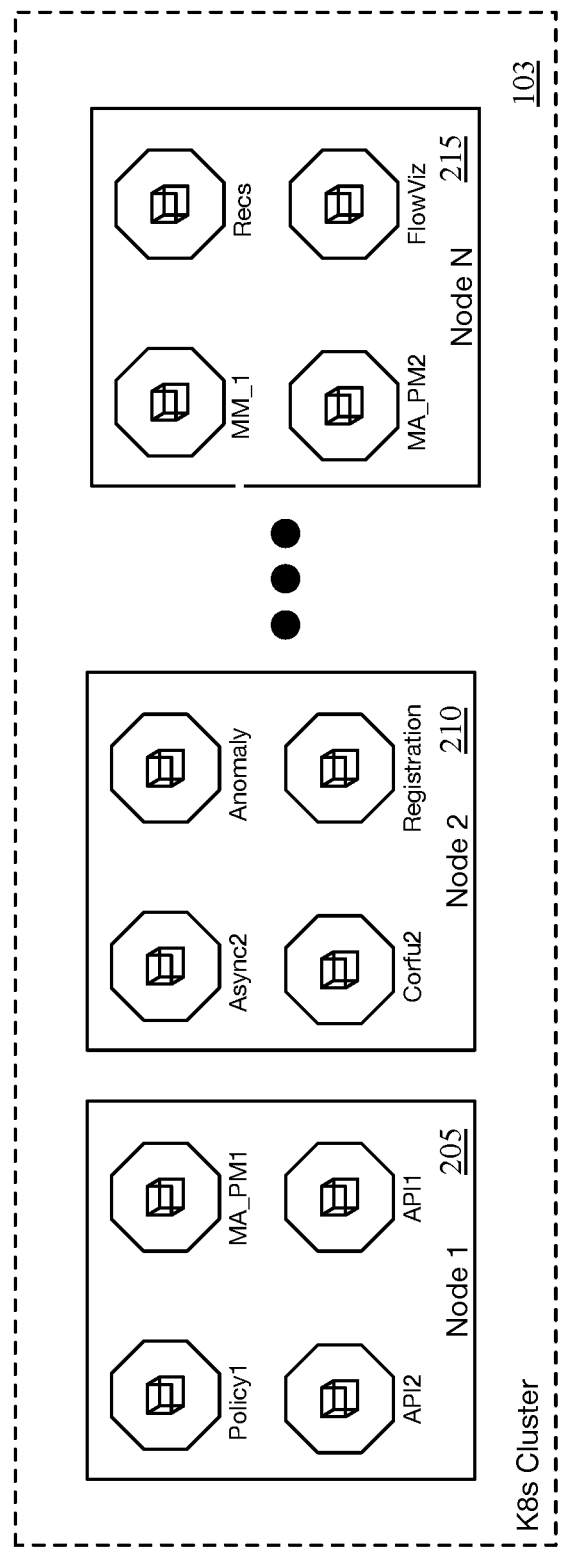
FIG. 2 conceptually illustrates a set of nodes in a container cluster, with various microservices of the three service instances distributed across these nodes.

It should be noted that the different microservices within a tenant-specific service instance (as well as the common services) may be placed on various different nodes within the container cluster. FIG. 2 conceptually illustrates a set of nodes 205-215 in the container (Kubernetes) cluster 103, with various microservices of the three service instances 105-115 distributed across these nodes. While this example illustrates four microservices per node, it should be understood that in practice a given node may host many more microservices, and the number of microservices assigned to each node will not necessarily be equal across the nodes.

In some embodiments, each of the nodes 205-215 is a virtual machine (VM) or physical host server that hosts one or more Pods in addition to various entities that enable the Pods to run on the node and communicate with other Pods and/or external entities. These various entities, in some embodiments, include a set of networking resources and network management agents, as well as standard Kubernetes agents such as a kubelet for managing the containers operating in the Pods. Each node operates a set of Pods on which the microservices run. Different embodiments assign a single microservice to each Pod or assign multiple microservices (e.g., that are part of the same service instance) to individual Pods.

In some embodiments, the scheduling of microservices to the different nodes 205-215 is controlled by a set of cluster scheduler components (e.g., a Kubernetes scheduler). As such, each of the nodes 205-215 may host a combination of services (including metrics collection agents, metrics collection managers, and metric analysis services) for various different tenant-specific service instances as well as the common services. Thus, for example, the first node 205 hosts two microservices (as well as the metrics collection agent) for the first policy manager service instance 110 in addition to a single microservice for the second policy manager service instance 125, while the second node 210 hosts two microservices for the second policy manager service instance 125, one common service (the registration service 130), and one microservice for the flow monitoring service instance 115. In some embodiments, the cluster scheduler component takes into account the relatedness of the microservices (i.e., that they belong to the same service instance) when assigning the microservices to nodes, but this is not necessarily dispositive as the scheduler also accounts for other factors. Thus, the health monitoring services may or may not reside on the same nodes as the various services that they monitor.

Even when two microservices from different service instances are assigned to the same node, these microservices are not necessarily able to communicate with each other. In some embodiments, each individual service instance is assigned a separate namespace in the container cluster 105, and all of the microservices belonging to that service instance are assigned to that namespace. The use of separate namespaces allows for isolation of the different service instances assigned to different tenants, as well as the reuse of internal names for resources (e.g., microservices) within the cluster.

Figure 3:
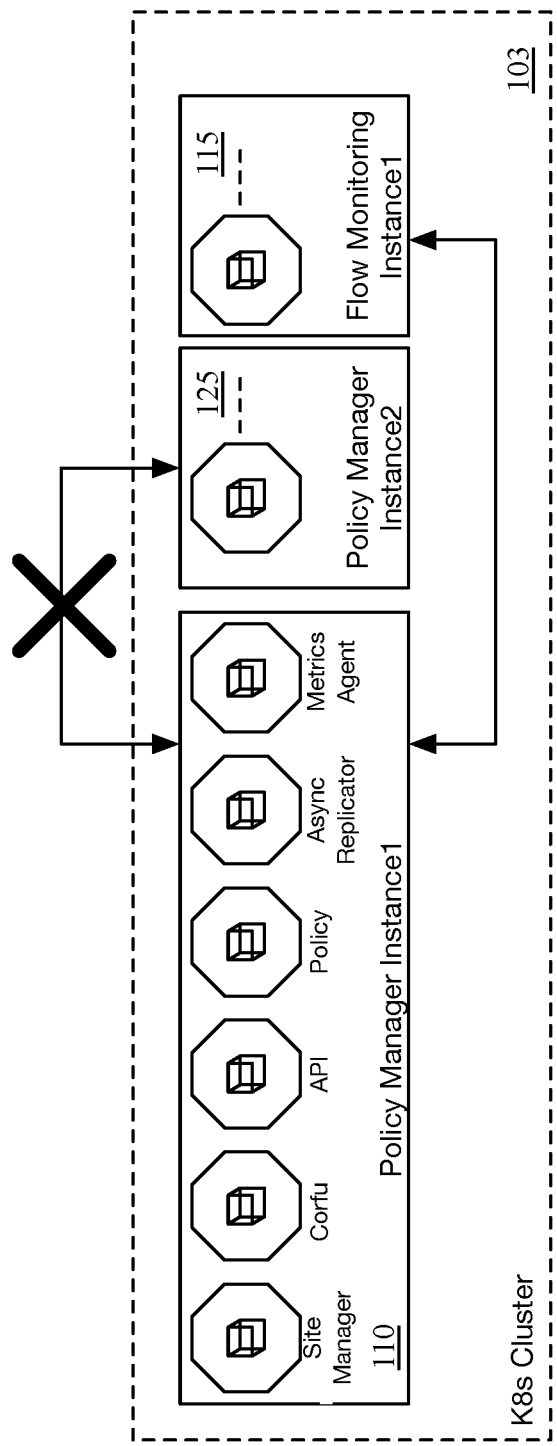
FIG. 3 conceptually illustrates the isolation of resources for different datacenter groups.

FIG. 3 conceptually illustrates the isolation of resources for different datacenter groups. As shown in this figure, the microservices belonging to the first policy manager service instance 110 are not able to communicate with the microservices belonging to the second policy manager service instance 125, because these policy manager services are associated with different datacenter groups and thus in different service instance groups. However, some embodiments allow communication between different service instances associated with the same datacenter group, or at least between certain microservices in different service instances associated with the same datacenter group. In this case, at least a subset of the microservices belonging to the first policy manager service instance 110 are allowed to communicate with the microservices belonging to the flow monitoring service instance 125. For instance, this enables the monitoring service instance 125 to retrieve aspects of the network configuration that are required to analyze the flows in that datacenter group as well as to provide generated firewall rules for the network to the policy management service instance 110.

In some embodiments, the container cluster 105 enforces the isolation of service instances from each other (while allowing other communication between service instances in the same group of service instances) via the generation of firewall rules for enforcement within the cluster. By assigning each service instance to a separate namespace, the container cluster can enforce the communication policies through the use of simple rules (e.g., block all traffic from resources in policy_instance1 to resources in policy_instance2, allow traffic from resources in policy_instance1 to resources in monitoring_instance1). In addition, the microservice instances within each namespace are allowed to communicate with each other.

In some embodiments, the metrics collection agents associated with different service instances are deployed to the namespaces of their respective service instance. This ensures that the metrics collection agents can communicate with all of the microservices from which they are configured to collect metrics without the need to define any specific rules for communication across namespaces. In some embodiments, the metrics collection manager is deployed in the namespace of the metric monitoring instance. In other embodiments, the metrics collection manager is deployed in a common namespace (e.g., a namespace used by the multi-tenant services) rather than that of any specific service instance.

Figure 4:
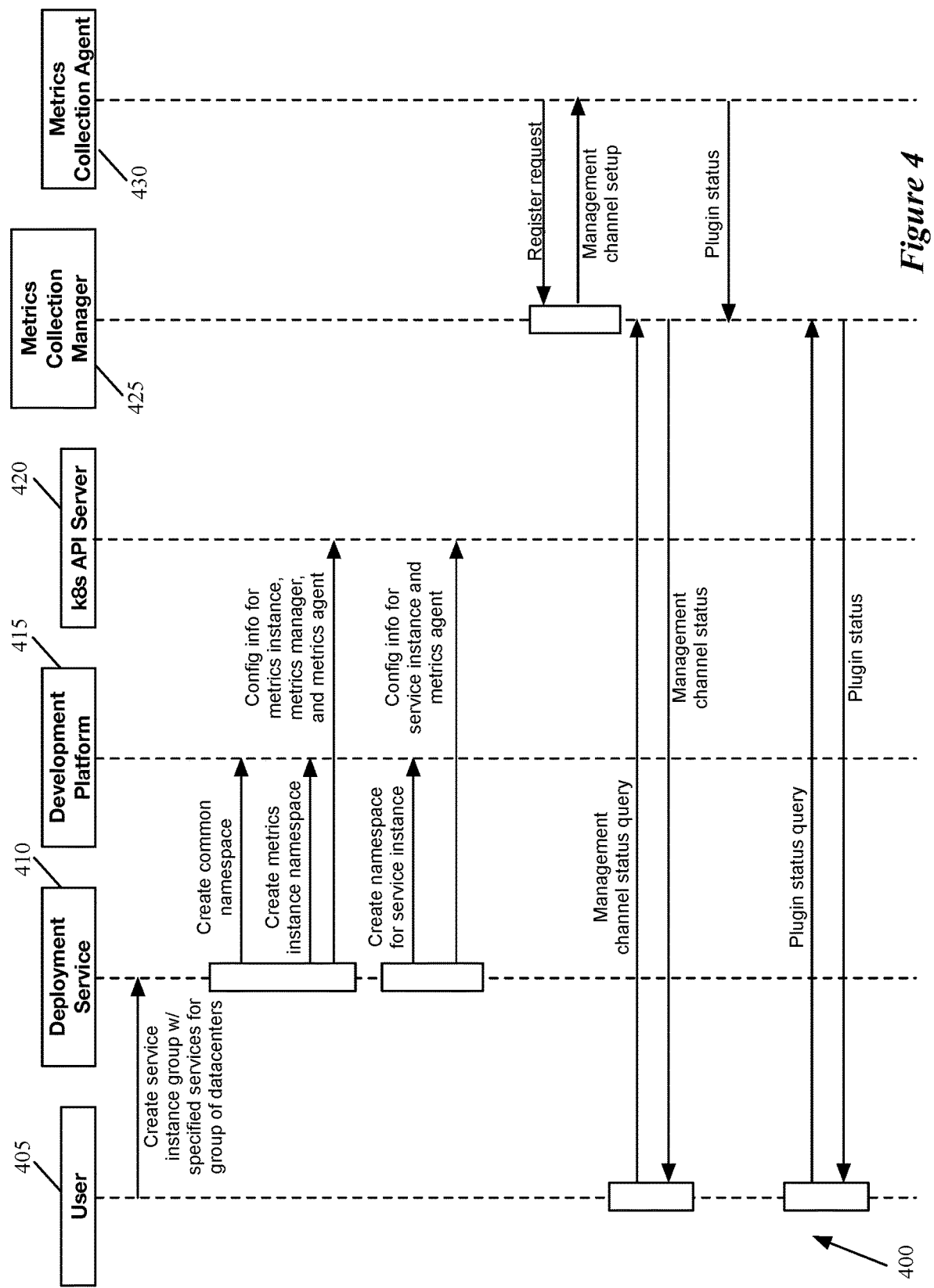
FIG. 4 conceptually illustrates a flow diagram that shows operations performed to deploy a group of service instances as well as the metrics collection architecture for that group of service instances in a network management system of some embodiments.

FIG. 4 conceptually illustrates a flow diagram 400 that shows operations performed to deploy a group of service instances as well as the metrics collection architecture for that group of service instances in a network management system of some embodiments. It should be noted that these operations may be performed separately for numerous different groups of service instances that are deployed to manage different groups of datacenters. In addition, many of the operations represented in the flow diagram 400 will be performed multiple times for a single group of service instances (e.g., to deploy each service instance, deploy and setup each of the metrics collection agents, etc.).

In this diagram, the user 405 represents a tenant of the network management system that interacts with the network management system to define a group of datacenters, subscribe to a set of services for managing those datacenters, configure the service instances performing those services as well as the metrics collection architecture for monitoring the service instances, and view information about the metrics and metrics collection architecture as well as the service instances. The user 405 communicates with the network management system via a user interface, in some embodiments (e.g., via a web browser or network management application interface). When the user indicates commands through such an interface, the commands are routed (via ingress routing mechanisms of the container cluster) to the appropriate services and/or service instances (e.g., the deployment service, an API of the policy manager service, etc.).

The deployment service 410 is a multi-tenant (common service) of the network management system that enables the creation of the various network management service instances in some embodiments. The deployment service interacts with the Kubernetes cluster to create the Kubernetes resources (e.g., Pods) for the services being deployed. The development platform 415, in some embodiments, is a secure managed platform (e.g., a platform as a service) that provides a collection of infrastructure (e.g., Kubernetes platform and cloud-native services) to the provider of the network management system. In other embodiments, the namespaces may be created directly through Kubernetes infrastructure or other mechanisms.

The Kubernetes API server 420 (kube-apiserver) is a Kubernetes controller for the cluster in which the network management system is implemented. In some embodiments, the API server 420 for the cluster provides a REST API via which components in the cluster (e.g., the deployment service 410) can define new Kubernetes resources for the cluster (e.g., to deploy new services). The API server 420 may also interact with other Kubernetes components (e.g., a scheduler) to deploy these resources.

The metrics collection agent 430 represents one of the metrics collection agents for the service instances of a service instance group (i.e., with one metrics collection agent deployed for each service instance), while the metrics collection manager 425 manages the metrics collection agent 430 as well as the metrics collection agent for the metric monitoring service and any other metrics collection agents for other service instances of the service instance group.

As shown, the user 405 initially sends a command to the deployment service 410 (e.g., through a user interface that sends the command to an ingress router for the container cluster) to create a service instance group with a specified set of services for a group of datacenters. In some embodiments, this is a command to define the datacenter group within the network management system as well as a set of services to be deployed for the datacenter group.

Based on this command, the deployment service 410 begins the deployment of the requested service instances in the container cluster. The deployment service 410 creates a common namespace and a namespace for the metric monitoring instance. In some embodiments, these namespaces are created with the development platform 415. The common namespace, in some embodiments, is a common namespace for the group of service instances, as opposed to the namespace used for all of the multi-tenant (common services). In other embodiments, this common namespace is the namespace used for the multi-tenant services and thus this operation may be omitted at this point (as the common namespace is already created). In some embodiments, the metrics collection manager 425 will be deployed to the common namespace along with certain other components related to the metrics collection manager 425 (e.g., a PostgreSQL database and/or Kafka event management platform).

The deployment service 410 also sends to the API server 420 configuration information for the metric monitoring instance for the service instance group, the metrics collection manager, and the metrics collection agent for the metric monitoring instance. In some embodiments, the deployment service 410 provides the configuration information by installing helm charts with the API server 420. The configuration information may specify the namespace into which each of the entities should be deployed, the names of the entities, the various different microservices that need to be deployed for a service instance and their resource requirements, etc.

In some embodiments, the metric monitoring instance is defined automatically for each service instance group to monitor the metrics of that service instance group. In other embodiments, the metric monitoring instance is only created if specified by the user; in this case, if the user does not subscribe to metric monitoring, then the metric monitoring instance as well as the metrics collection agents and metrics collection managers do not need to be deployed. The metric monitoring instance, as noted, is deployed within its own namespace, which is unique within the container cluster. The metrics collection agent for the metric monitoring service is also deployed within this metrics service namespace.

The metrics collection manager 425, in some embodiments, is also deployed in the namespace of the metric monitoring instance. In other embodiments, the metrics collection manager 425 is deployed in the common namespace (e.g., a namespace used by the multi-tenant services) rather than that of any specific service instance. The latter option, in some embodiments, enables easier communication with all of the metrics collection agents in the service instance group, as firewall rules enforced by the Kubernetes networking infrastructure can be defined to allow all of the metrics collection agents (or any services within the service instance group) to communicate with entities in the common namespace.

Next, the deployment service 410 performs operations to deploy the specified service instances. Though shown for a single service instance (e.g., a policy manager instance, a flow monitoring instance, etc.), it should be understood that these operations are performed for each service instance in the service instance group. The deployment service 410 creates a namespace for the service instance with the development platform 415, then provides configuration information for both the service instance and a metrics collection agent 430 for the service instance to the Kubernetes API server 420. As before, in some embodiments, this configuration information is provided to the API server 420 as helm charts. The API server 420 is then responsible for deploying these service instances to the computer cluster and orchestrating the cluster back-end operations necessary to ensure their proper operation.

The subsequent operations in the flow diagram 400 occur once the metrics collection agent 430 (i.e., one of the metrics collection agents for a service instance of the service instance group) and the metrics collection manager 425 have been deployed. As shown, when it is deployed, the metrics collection agent 430 sends a registration request to the metrics collection manager 425 and the metrics collection manager 425 sets up a management channel with the metrics collection agent 430. In some embodiments, this management channel is a remote procedure call (RPC) channel (e.g., a gRPC channel), though other embodiments may use other types of API channels instead.

For this process to work, in some embodiments the metrics collection manager for a service instance group is always deployed prior to deployment of any of the metrics collection agents for the service instance group. To setup the channel, in some embodiments the metrics collection agent 430 is configured (at deployment) to use the namespace and service name of the metrics collection manager 425 to find the network address of the metrics collections manager 425 (e.g., using DNS service discovery). The metrics collection manager 425 can then complete the setup of the channel with the metrics collection agent 430. As described further below, through this channel the agent 430 provides the manager 425 with a list of the services that the agent 430 monitors and the metrics collected for each service, allowing the manager 425 to provide this information to the user 405, receive changes to the configuration, and provide these changes to the agent 430.

As noted, the user 405 can interact (e.g., via a user interface) with the metrics collection manager 425. For instance, the user 405 may query the status of the management channel between the metrics collection manager 425 and the metrics collection agent 430 (or any of the other metrics collection agents) and receive a reply from the metrics collection manager 425. This query can be sent upon request of the user or automatically by the user interface (e.g., by a network management application that provides the user interface). In some embodiments, the metrics collection agent 430 provides a status of its plugin component (described further below) to the metrics collection manager 425, which the user 405 can also query.

Though not shown, the deletion of a service instance (e.g., if the user unsubscribes from a particular service) follows the inverse process. The metrics collection agent 430 sends a request to the metrics collection manager 425 to unregister, prompting the manager 425 to tear down the management channel that was set up between the two components. The deployment service 410 communicates with the API server 420 to remove the service instance and the metrics collection agent 425 for that service instance (e.g., by deleting helm charts, prompting the API server 420 to delete the resources allocated to the agent 425 and the various services of the service instance). The deployment service 410 also deletes the namespace for that service with the development platform 415.

Once the service instances and metrics collection architecture have been deployed and configured for a datacenter group, the metrics collection agents communicate with the services in their respective namespaces (i.e., their respective service instances) to collect values for various metrics and report these metrics to the metric monitoring instance of the service instance group. The metrics manager, meanwhile, communicates with the metrics agents to discover what metrics they are collecting from each of the services in their respective service instances, provide this data to the tenant, and update the metric agent with any configuration changes requested by the tenant.

Figure 5:
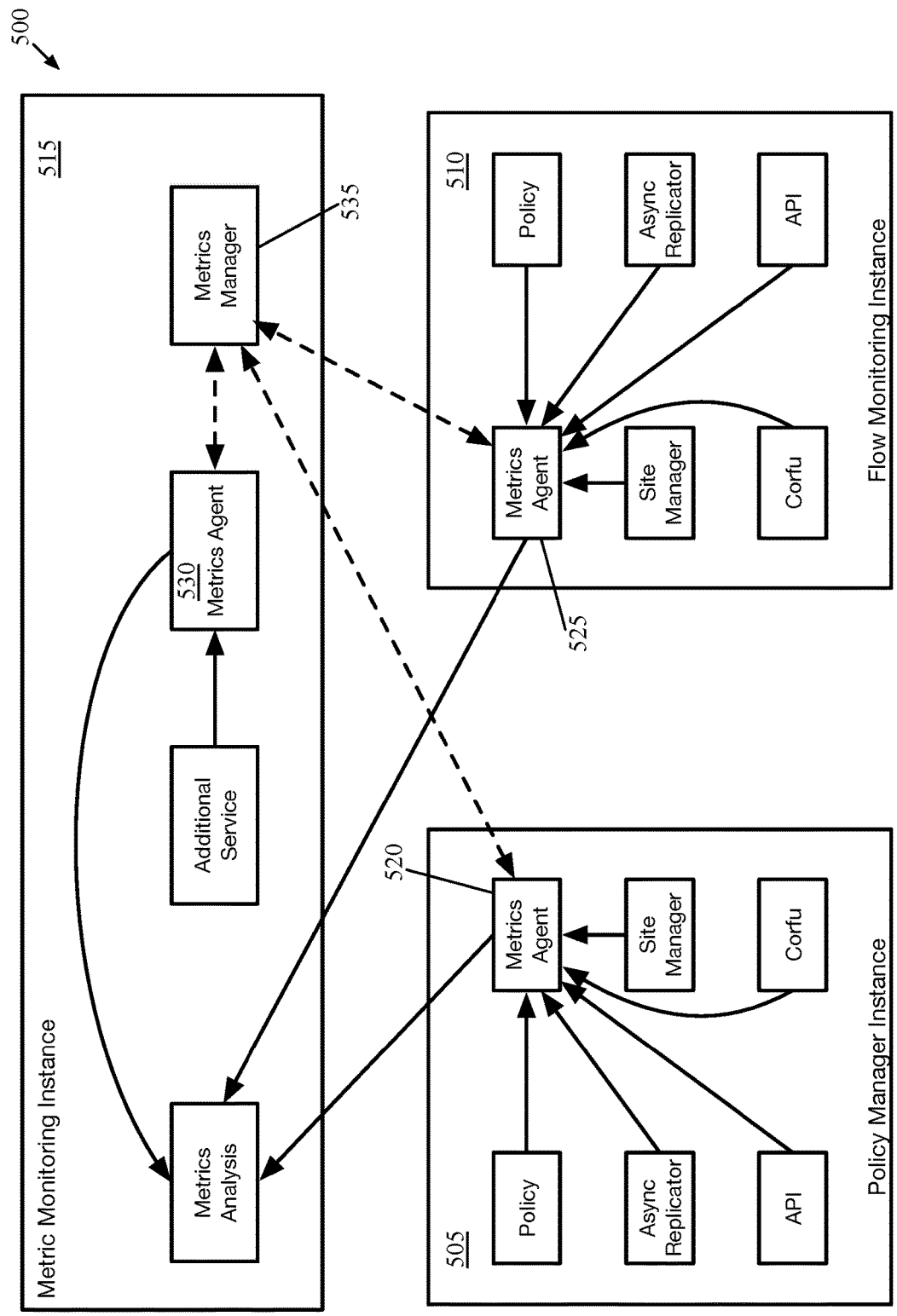
FIG. 5 conceptually illustrates the flow of metric data and metrics collection configuration data for a single group of service instances within a network management system of some embodiments.

FIG. 5 conceptually illustrates the flow of metric data and metrics collection configuration data for a single group of service instances 500 within a network management system of some embodiments. As shown, the group of service instances 500 includes a policy manager instance 505, a flow monitoring instance 510, and a metric monitoring instance 515. Operating within each of these service instances 505-515 is a respective metrics collection agent 520-530, with a metrics collection manager 535 also operating within the metric monitoring instance 515 (though as noted, in some embodiments the metrics collection manager actually operates in a common namespace for the service instance group 500).

Configuration data (represented by dashed lines) is exchanged between the metrics collection manager 535 and the metrics collection agents 520-530. In some embodiments, each metrics collection agents 520-530 indicates to the metrics collection manager 535 from which services that agent collects metrics (e.g., based on interaction with the Kubernetes API server to identify services in their respective namespaces). The metrics collection manager 535, based on tenant input, provides configuration data to the agents 520-530 that can turn on and off metrics collection for specific services and/or individual metrics.

The actual metrics data is retrieved by each of the metrics collection agent 520-530 from their respective services, according to the configuration data. In some embodiments, a first subset of the services expose APIs that the metrics collection agents call at regular intervals in order to retrieve values for a requested set of metrics. A second subset of the services, on the other hand, may not always be available to respond with metric values upon request. These services, in some embodiments, execute a metrics collection client that pushes metric data to the appropriate metrics collection agent 520-530. Upon collection of this metric data, the metrics collection agents 520-530 provide the data to a metrics analysis service 540 within the metric monitoring instance 515. In some embodiments, the Kubernetes cluster networking is configured to specifically allows this cross-namespace traffic. It should be noted that, in some embodiments, the metrics analysis service 540 provides its metric data to the metrics agent 530 for the metric monitoring instance 515, which then returns the metric data to the analysis service 540. In other embodiments, the metrics analysis service 540 bypasses the collection agent 530 and simply stores its own metric data with that from other services.

Figure 6:
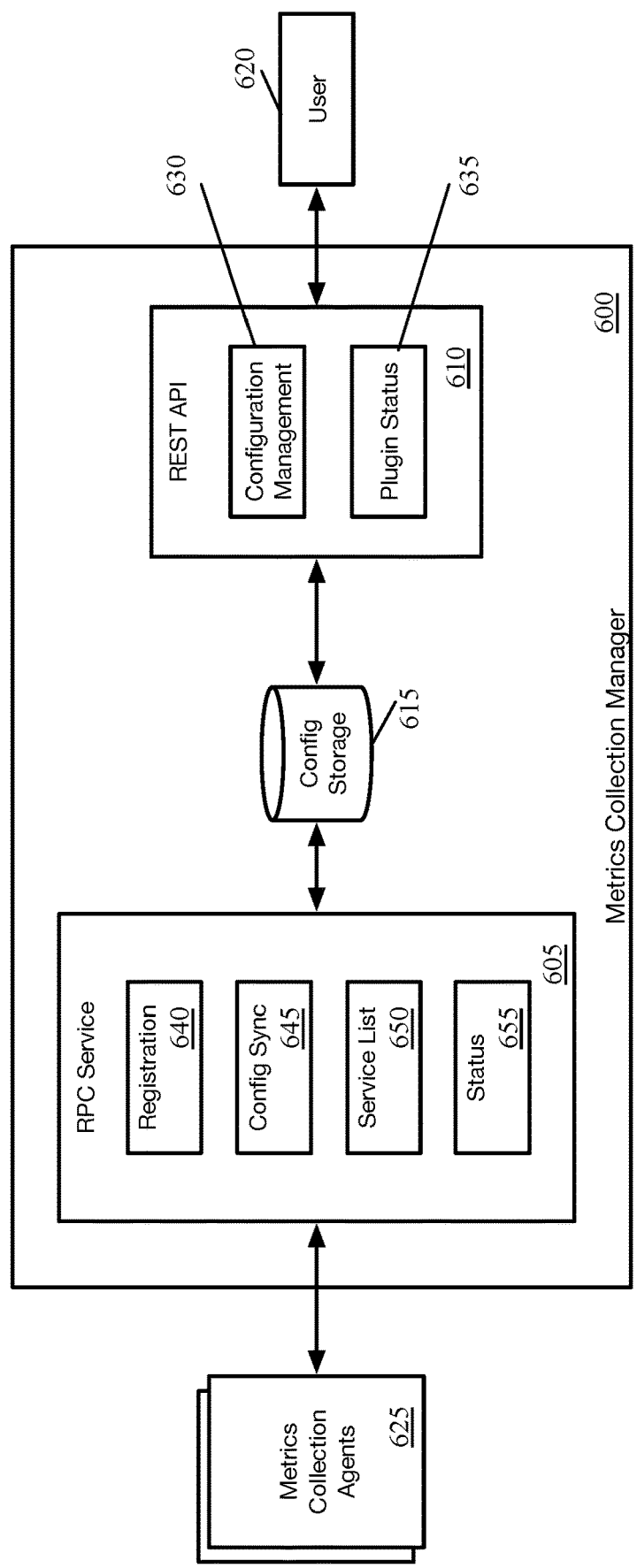
FIG. 6 conceptually illustrates the architecture of a metrics collection manager of some embodiments.

Having described the metric collection architecture within a cloud-based multi-tenant network management system, the detailed operations of the metrics collection manager and metrics collection agents will now be described. FIG. 6 conceptually illustrates the architecture of a metrics collection manager 600 of some embodiments. As shown, the metrics collection manager 600 includes an RPC service 605, a REST (Representational State Transfer) API 610, and a configuration storage 615. The metrics collection manager 600 interacts with both a user 620 and one or more metrics collection agent 625.

The REST API 610 includes APIs for configuration management 630 and plugin status 635 in some embodiments. As described below, the metrics collection agents 625 each execute a plugin (or plugins) that specifies the metrics to be collected. The metrics collection manager 600 needs to verify the status of this plugin, and the user may request to know the current plugin status. As such, the REST API 610 includes the plugin status API 635 that the tenant user 620 can call in order to verify the plugin status of any of the metrics collection agents 625. In some embodiments, the user 620 can also request to know the current status of the RPC channels between the metrics collection manager 600 and each of the metrics collection agents.

The configuration management API 630 enables the user 620 to view the current metrics collection configuration and modify the configuration. This configuration management API 630 may include commands to list all of the services for which metrics are collected (e.g., all of the various microservices for each service instance in the service instance group). In some embodiments, the metrics collection manager 600 provides this list grouped by metrics collection agent (i.e., indicating which agent collects metrics from which services). Some embodiments also provide additional detail via the API 630, such as specific Pods on which each microservice is implemented.

The configuration management API 630 also enables various specific controls over the configuration. For instance, in some embodiments, the user 620 can modify the time interval(s) between metric data collection by the various metrics collection agents 625. In different embodiments, there is a single time interval that the user can set for all of the agents, separate time intervals for each agent (i.e., for all services from which the agent collects metric data at regular intervals), or separate time intervals for each service from which each agent collects metric data at regular intervals. In some embodiments, the user 620 can also modify from which services each agent collects metric data and/or which specific metrics are collected from each service.

In some embodiments, this configuration data is stored in the configuration storage 615. The configuration storage 615, in some embodiments, is actually a database (e.g., a Kafka database) that is separate from the Kubernetes resource(s) used for the metrics collection manager 600. That is, in some embodiments, the configuration storage 615 does not reside on the same Pod as the metrics collection manager 600, but is instead a separate entity (e.g., in the same namespace as the metrics collection manager 600). The configuration storage 615 stores information received from the metrics collection agents 625 indicating the services from which each of the agents 625 collects metrics and, in some cases, which metrics are collected from each service. The users can then (via the configuration management API 630) enable or disable metric collection from these services and/or of specific metrics.

The RPC service 605 manages RPC channels (e.g., gRPC channel) between the metrics collection manager 600 and each metrics collection agent 625. In some embodiments, these channels are setup by the metrics collection agents 625 upon deployment of those agents. When an agent 625 is deployed for a service instance of a service instance group, that agent discovers the metrics collection manager 600 for the service instance group, then initiates (i) registration and (ii) management channel setup with the manager 600.

As shown, several functions are performed over the RPC channel, including registration 640, configuration synchronization 645, service list synchronization 650, and status notification 655. Registration 640, as noted, is initiated by the metrics collection agents 625 upon deployment of those agents. Service list synchronization 650 is also initiated by the metrics collection agents 625 as those agents provide the list of services that they monitor (and, in some cases, the list of metrics for each service) to the metrics collection manager 600, information that the manager 600 then stores in the configuration storage 615. In different embodiments, the metrics collection manager 600 either requests the status 655 or the metrics collection agents 625 automatically provide the status to the manager 600 via the RPC channel. Lastly, whenever the metrics collection configuration for a particular agent 625 is updated (e.g., based on user interaction), the manager 600 performs configuration synchronization 645 over the RPC channel with that particular agent 625 to provide the update to the agent 625. In addition, if connection with a metrics collection agent 625 is lost, some embodiments trigger an alarm that notifies the user of this issue.

Figure 7:
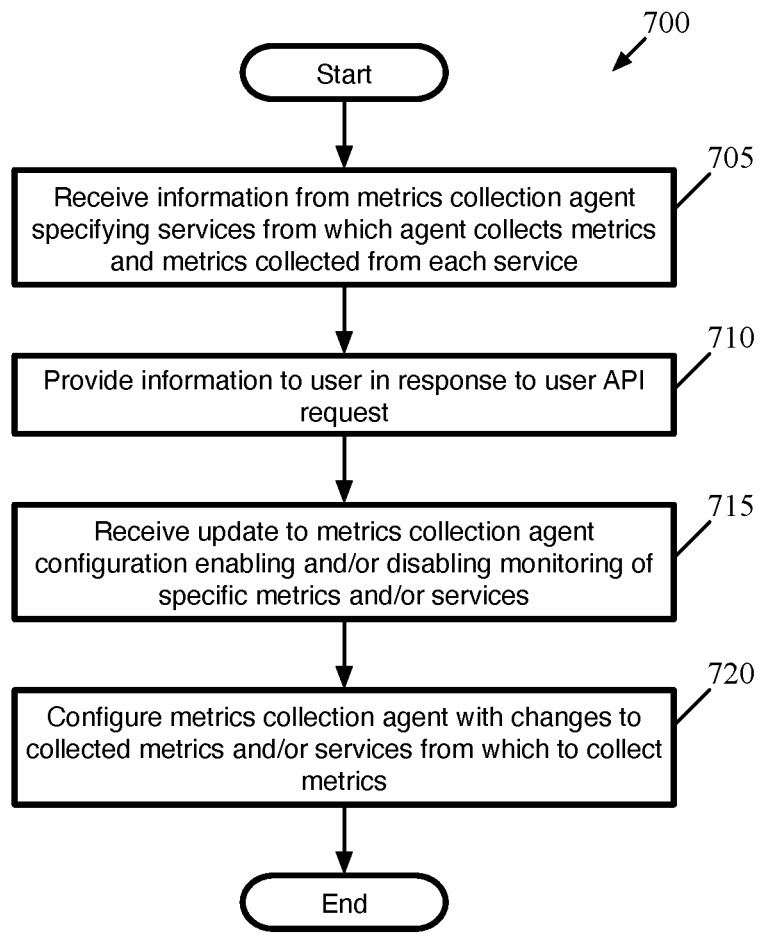
FIG. 7 conceptually illustrates a process of some embodiments for configuring a metrics collection agent.

FIG. 7 conceptually illustrates a process 700 of some embodiments for configuring a metrics collection agent. In some embodiments, the process 700 is performed by a metrics collection manager that manages the metrics collection agent. It should be noted that the process 700 is a conceptual process and is not necessarily performed linearly. For instance, a user might wait an extensive amount of time before making changes to the metrics collection configuration of a metrics collection agent. In addition, in some embodiments the metrics collection manager performs these operations, or similar operations, for multiple different metrics collection agents in a service instance group.

As shown, the process 700 begins by receiving (at 705) information from a metrics collection agent specifying the services from which that metrics collection agent collects metric values as well as which metrics are collected from each service by the metrics collection agent. In some embodiments, the metrics collection agent learns about the services from which to collect metric values by contacting the Kubernetes API server. In some such embodiments, a default set of metrics are collected for each service (e.g., CPU usage, memory usage, API response time, etc.). In addition, some services provide metric values to the agent on a push basis, as discussed further below. These services specify to the metrics collection agent which metric values will be provided. The metrics agent (either at initial registration, periodically, or both) notifies the metrics collection manager of these settings.

The process 700 next provides (at 710) this information to the user. In some embodiments, this occurs when the user logs into the metrics collection manager (e.g., by authenticating with the network management system) and then requests to view the configuration of one or more metrics collection agents. The request is received through the manager's REST API, and the response provided back to the user for the user to view the configuration information in their user interface (e.g., via a web browser or separate application).

From the user, the process 700 receives (at 715) an update to the metrics collection agent configuration. As mentioned, this update can specify certain services from which metrics should be or should not be collected. More granularly, some embodiments allow the user to enable or disable the collection of specific metrics from specific services (e.g., a user might not care about the API response time for certain services). In some embodiments, these changes are stored in the configuration storage database maintained by the metrics collection manager. In addition, some embodiments allow the user to specify changes to the time interval(s) at which the metrics collection agent requests metric values from the services.

Finally, based on the update, the process 700 configures (at 720) the metrics collection agent with the changes specified by the user. In some embodiments, these configuration changes are provided to the metrics collection agent via the RPC channel set up between the two entities. The metrics collection agent then updates its configuration and continues to collect metrics from its monitored services according to the new configuration.

Figure 8:
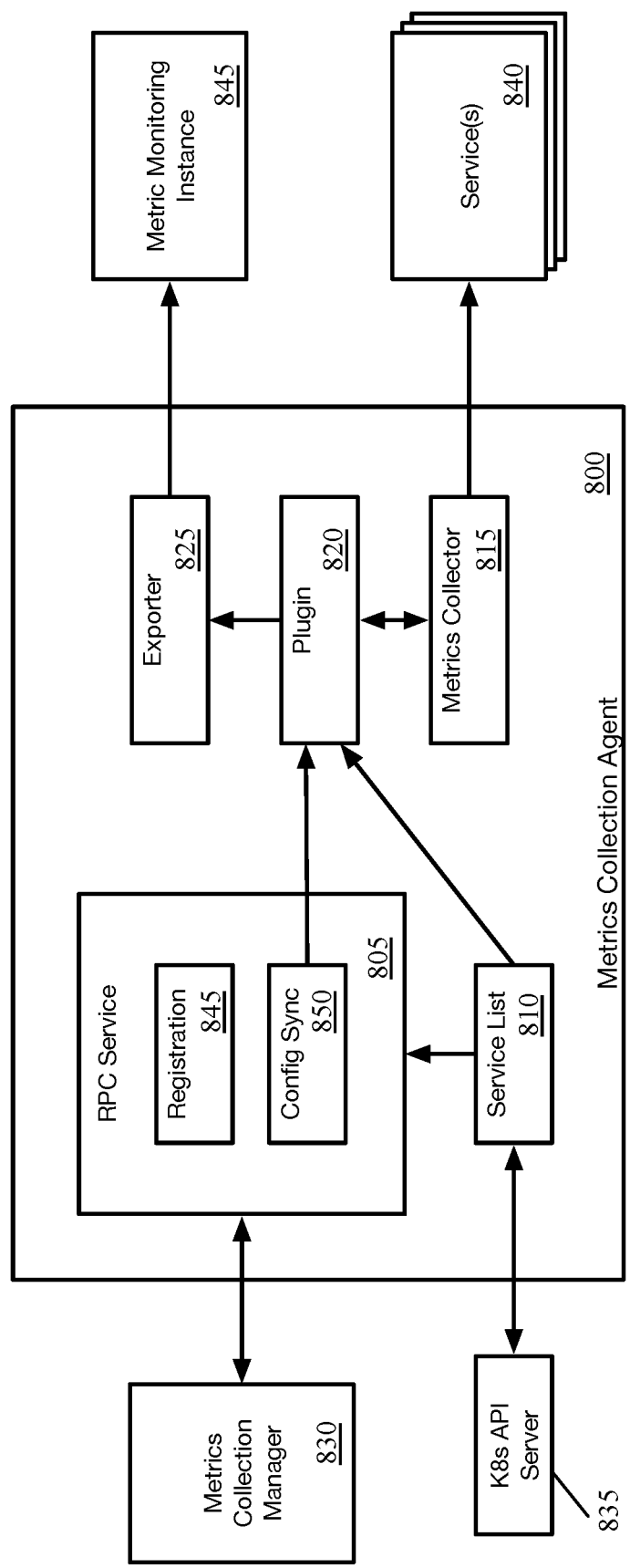
FIG. 8 conceptually illustrates the architecture of a metrics collection agent of some embodiments.

FIG. 8 conceptually illustrates the architecture of a metrics collection agent 800 of some embodiments. As shown, the metrics collection agent 800 includes an RPC service 805, a service list module 810, a metrics collector 815, a plugin 820, and an exporter module 825. The metrics collection agent 800 interacts with its metrics collection manager 830 (e.g., the metrics collection manager shown in FIG. 6), a Kubernetes API server 835 for the Kubernetes cluster in which the network management system is implemented, a set of services 840, and a metric monitoring instance 845.

The RPC service 805 manages the RPC channel (e.g., gRPC channel) between the metrics collection agent 800 and the metrics collection manager 830. As described above, in some embodiments this channel is setup by the metrics collection agent 800 at the time the agent is deployed. In some embodiments, the metrics collection agent 800 uses the namespace and service name of the metrics collection manager 830 to determine how to contact the manager 830 (e.g., using DNS to determine a network address for the manager), then sends a registration message to the manager to create the RPC channel. As mentioned, in some embodiments the metrics collection manager is deployed prior to any of the metrics collection agents for a service instance group in order to ensure that the metrics collection manager will be available to receive this registration request when the metrics collection agent is deployed.

Though FIG. 8 only includes registration 845 and configuration synchronization 850, in some embodiments the same functions shown in FIG. 6 (for the metrics collection manager RPC service 605) are found at the metrics collection agent 800. From the agent perspective, the registration 845 initiates the RPC channel with the metrics collection manager 830 upon deployment of the metrics collection agent 800. The configuration synchronization 850 receives metrics collection configuration updates from the metrics collection manager 830. In addition, the RPC service 805 can be used to provide status updates (e.g., for plugin 820) and a list of services monitored to the manager 830. In some embodiments, if the connection to the manager 830 is lost, the agent 800 raises an alarm within the system.

The service list module 810 is responsible, in some embodiments, for contacting the Kubernetes API server 835 in order to determine the list of services from which the metrics collection agent 800 will collect metric values. As discussed, the metrics collection agent 800 is deployed to the same namespace as the services 840 from which it collects metrics. In some embodiments, the service list module 810 (or another component of the metrics collection agent) monitors a service discovery feature of the API server 835 to learn when new services are added to that namespace or services are removed from the namespace. In general, the services assigned to a namespace should not change all that often, as they are part of an executing service instance, even if the Pods or other resources on which those services execute change. Via the RPC service 805, the metrics collection agent 800 reports any changes to this list of services to the metrics collection manager 830. In different embodiments, the metrics collection agent 800 may only report changes (i.e., deltas) or the entire list of services. In some embodiments, the agent 800 regularly reports the entire list of services (whether any have changed or not) as a status update, and the manager 830 compares this list to the previous list to determine any changes.

The metrics collector 815, plugin 820, and exporter 825 are the components of the metrics collection agent 800 of some embodiments that perform the actual metrics collection. In some embodiments, though shown as single components, the metrics collection agent #700 actually instantiates separate metrics collectors 815 and plugins 820 for each separate service that the agent 800 monitors. In some such embodiments, when the metrics collection agent 800 reports the plugin status to the metrics collection manager 830 over the RPC channel, the manager 830 learns which services are currently being monitored by the agent 800.

The plugin 820, in some embodiments, stores the configuration of the agent. That is, the plugin 820 specifies from which services metrics should be collected, which metrics should be collected from each service, and the intervals at which these metrics should be collected. In some embodiments, the plugin 820 is also responsible for ensuring that the metrics collector 815 collects metric values from the services 840 at the correct time as well as providing these collected metric values to the exporter 825 for the metric values to be exported to the metric monitoring instance 845. In some embodiments, the plugin 820 also performs a preliminary analysis of certain metric values prior to export. Specifically, as described below, in some embodiments the plugin 820 determines whether status metrics have changed and only provides the status metrics for export if the value has changed.

In addition, in some embodiments the plugin (or a specific plugin) 820 collects metrics for the metrics collection agent 800 (e.g., for the agent generally or for specific components of the agent). These metrics can include the data size of all metrics collected at the agent 800, the status, execution time (e.g., for each time interval), and execution error count for one or more threads executing for the agent 800 (e.g., the metrics collector 815), queue sizes, and/or command execution times for the RPC service 805 in some embodiments.

The metrics collector 815 (or collectors, in the case that separate metrics collectors are instantiated for each monitored service) is responsible for communicating with the services 840 to retrieve metric values from the services. In some embodiments, the plugin 820 commands the metrics collector 815 to collect metric values at regular intervals according to the user configuration provided by the manager 830. The metrics collector 815 contacts the APIs exposed by the different services 840 to request the metric values, then receives these metric values as messages from the services. As discussed below, in some embodiments the metric values are sent by the services 840 as protobuf messages that store the metric values. In addition, certain services do not expose an API but instead push metric values to the metrics collection agent 800 (e.g., to the metrics collector 815) as needed. In some embodiments, the metric values are received by the metrics collector 815 in the same format (e.g., protobuf format) irrespective of whether the metrics collector 815 pulls the metric values from services 840 via API requests or the metrics are pushed by the services.

In some embodiments, the metrics collection agent 800 also collects metric values from the metrics collection manager 830. In other embodiments, however, the metrics collection manager 830 directly reports its metric values to the metrics monitoring instance 845 (e.g., via a dedicated reporter). Examples of these metrics may include the response time for an API call, execution time for an RPC call, memory cache size, queue size, and execution time for various synchronization jobs.

The exporter 825, in some embodiments, is responsible for exporting collected metrics to the metric monitoring instance 845 (e.g., to a specific service that is part of the metric monitoring instance 845). In some embodiments, the plugin 820 receives the collected metric values from the metrics collector 815, then commands the exporter to provide some or all of the metric values to the metric monitoring instance 845. The plugin 820, has the exporter 825 export all statistic metric values but only exports status values when the status has changed. The exporter 825 communicates with the metric monitoring instance 845 via an RPC (e.g., gRPC) channel in some embodiments, though other embodiments may use different types of channels for providing metrics data. In some embodiments, if the connection to the metric monitoring instance 845 is lost (or if the agent is dropping metrics unexpectedly), the agent 800 raises an alarm within the system.

Figure 9:
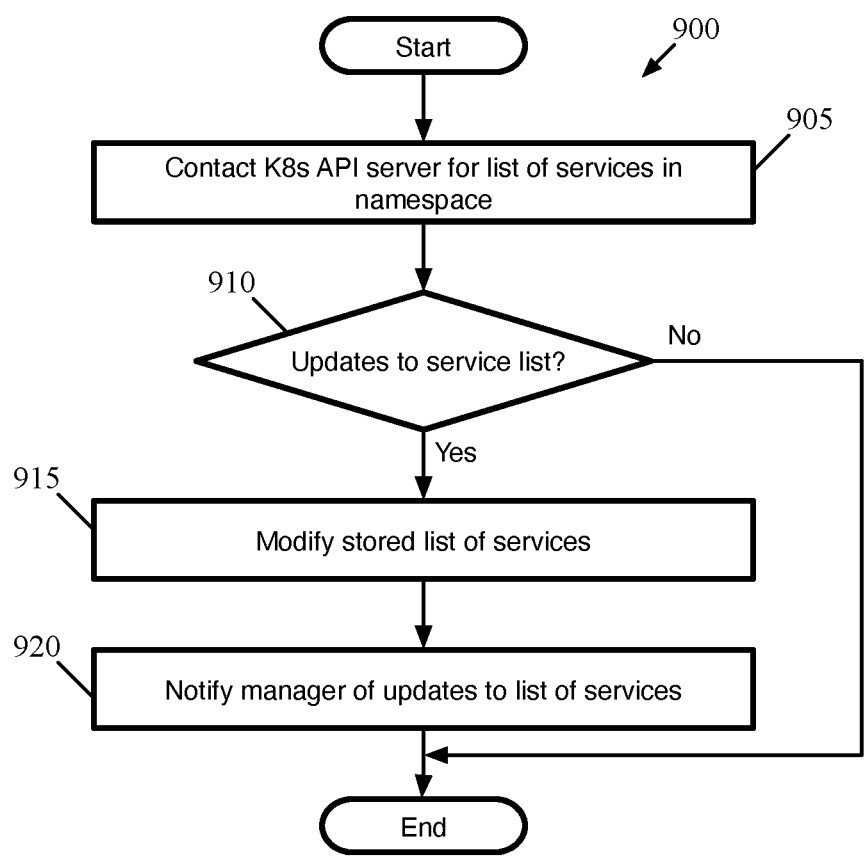
FIG. 9 conceptually illustrates a process of some embodiments for updating the list of services from which a metrics collection agent collects metric values.

FIG. 9 conceptually illustrates a process 900 of some embodiments for updating the list of services from which a metrics collection agent collects metric values. The process 900 is performed by a metrics collection agent (e.g., by the service list module 810 or a combination of modules within a metrics collection agent).

As shown, the process 900 begins by contacting (at 905) the Kubernetes API server for the list of services in the same namespace as the metrics collection agent. In some embodiments, the metrics collection agent uses the Kubernetes ServiceDiscovery API to watch for any changes to the list of services in the namespace. In different embodiments, the metrics collection agent may either regularly contact the Kubernetes API server to check on the list of services or may be setup to receive notifications or detect when the list of services has changed.

In some embodiments, each service is defined in Kubernetes to specify (i) whether the service should be monitored by the metrics collection agent (i.e., whether metrics should be collected for the service), (ii) the protocol by which the service exposes their metrics (e.g., HTTP/HTTPS or gRPC, as further described below), (iii) the port name via which the metrics are exposed, and (iv) a default time interval (which can be modified by the user via the metrics collection manager) for metric value collection from the service. In some embodiments, the service definition also specifies the name of the API endpoint (e.g., policy.api.v1.stats) and any headers that are required to retrieve the metrics. In some embodiments, these APIs are protected by certificates issued by the Kubernetes cluster.

Next, the process 900 determines (at 910) whether there are any updates to the service list. It should be understood that the process 900 is a conceptual process and that the metrics collection agent of some embodiments does not necessarily make the determination of 910. For instance, if the metrics collection agent watches the list of services via the ServiceDiscovery API, then the process 900 only occurs when a change is detected and therefore there is no specific "decision" performed. On the other hand, if the metrics collection agent regularly contacts the API server for the list of services, then the agent will need to determine each time whether the list of services has changed. If there is no change to the list of services, no action need be taken and the process 900 ends.

When there is a change to the list of services, the process 900 modifies (at 915) the stored list of services. In some embodiments, the plugin of the metrics collection agent stores this list of services. In other embodiments, as noted above, the metrics collection agent instantiates a separate plugin and metrics collector for each service from which the agent is tasked with collecting metric values. In some such embodiments, the creation of the new plugin to monitor a new service (or deletion of a plugin when its corresponding service is deleted) is the action taken by the agent to track the list of services to be monitored.

The process 900 also notifies (at 920) the metrics collection manager of the update(s) to the list of services monitored by the agent. In some embodiments, the agent provides the manager (via the RPC channel) with the list of services so that the manager can then provide this information to the tenant user in order for the user to configure the metrics collection of the agent. In some embodiments, this is provided as the plugin status of the agent (e.g., a list of plugins instantiated on the agent and the services from which each plugin collects metrics).

Figure 10:
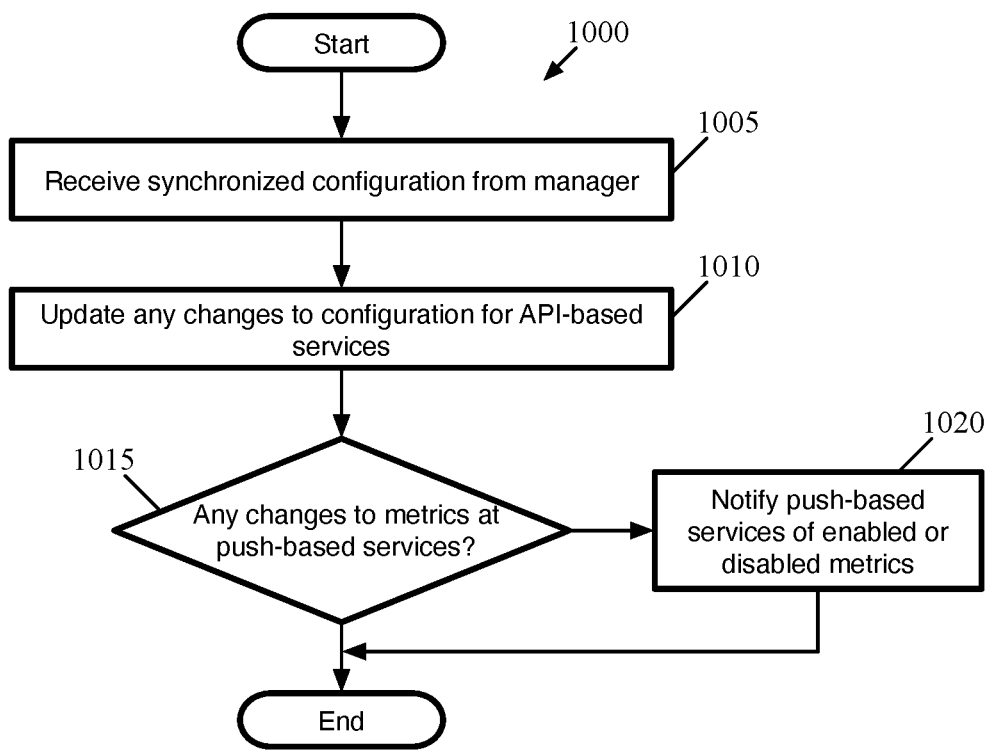
FIG. 10 conceptually illustrates a process of some embodiments for handling configuration changes at the metrics collection agent.

FIG. 10 conceptually illustrates a process 1000 of some embodiments for handling configuration changes at the metrics collection agent. In some embodiments, the process 1000 is performed by the metrics collection agent. The agent, at this point, would have provided its list of monitored services to the metrics collection manager, which then interacts with the tenant user to provide this information to the user and receive any configuration changes from the user.

As shown, the process 1000 begins by receiving (at 1005) synchronized configuration from the metrics collection manager. In some embodiments, this configuration information is received from the metrics collection manager via the RPC channel between the manager and the agent. When a user modifies the metrics collection configuration for one or more services monitored by a particular metrics collection agent, the manager sends these configuration changes to the correct agent. The configuration changes may include enabling or disabling collection of metrics generally from one or more services, enabling or disabling the collection of specific metrics from one or more services, and/or modifying the time interval at which metrics are collected (for services from which the metric values are pulled via API). In different embodiments, the time interval settings may be different for each monitored service or a single setting for all of the services (i.e., all of the services from which the metric values are pulled via API).

Next, the process 1000 updates (at 1010) any changes to the configurations for services from which the metrics are collected via API. In some embodiments, the collection of metrics for these services is managed by the plugin component of the metrics collection agent, or by separate individual plugins for each service. In the former case, the configuration changes are propagated to the plugin so that the plugin controls the metrics collector component to send API calls for the correct metrics from the correct services at the correct time intervals, per the configuration. In the latter case, for changes enabling or disabling the monitoring of a service, the agent instantiates or deletes the corresponding plugin. For changes to the set of metrics collected or the time interval for a specific service, the configuration of the plugin corresponding to that service is updated based on the received configuration.

In addition, the process 1000 determines (at 1015) whether any changes relate to metrics at push-based services. As noted (and as discussed further below), in some embodiments a subset of the services monitored by a metrics collection agent do not expose APIs for the metrics collection agent to contact. Specifically, certain services are not able to be regularly contacted by the metrics collection agent. For instance, for some services metrics are only available when a job is actually running. These services therefore provide metric values in a push manner and notify the metrics collection agent of the metrics that will be pushed to the agent. In some embodiments, a tenant can configure which of these metrics should be pushed to the agent (e.g., by enabling or disabling specific metrics).

If the configuration update changes which metrics a particular service should push to the metrics collection agent, the process 1000 notifies (at 1020) these push-based services of the enabled or disabled metrics. The process 1000 then ends. In some embodiments, the metrics collection agent communicates with a metrics collection client that executes in the service and that handles the pushing of metric values to the agent. In this case, any changes to enable or disable metrics (i.e., specifying which metrics should or should not be pushed to the agent) are provided to this metrics collection client by the agent.

Figure 11:
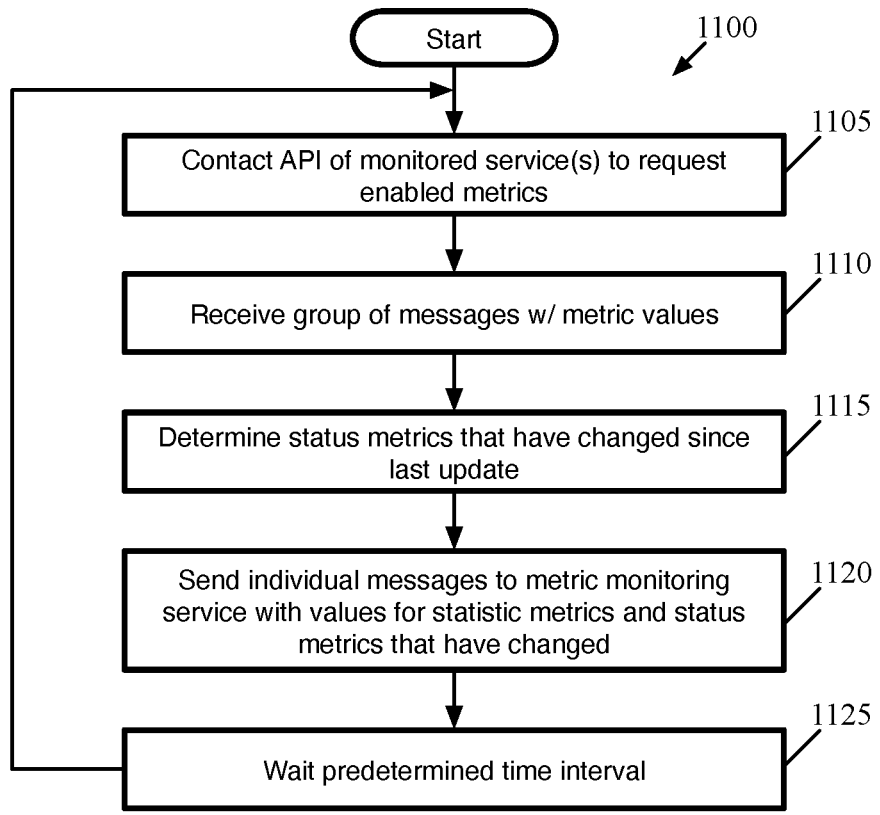
FIG. 11 conceptually illustrates a process of some embodiments for collecting metric values from a set of one or more services.

Having described the configuration of the metric collection, the processes for collecting and exporting metrics will now be described. FIG. 11 conceptually illustrates a process 1100 of some embodiments for collecting metric values from a set of one or more services. The process 1100 is performed by a metrics collection agent in some embodiments. It should be noted that the process 1100 relates to collection of metric values from services that the agent contacts via API, rather than the services that provide metric values in a push manner. However, in some embodiments, operations 1110-1120 apply to metric values received from the services that push these metric values to the agent.

As shown, the process 1100 beings by contacting (at 1105) the API of one or more monitored services to request metric values for the metrics currently enabled for that service or services. For embodiments that instantiate a single plugin and metrics collector for all of the monitored services (that provide metrics on a pull basis through API calls), the process contacts all of these services at the same time if one time interval is set for all of the services. If different time intervals are set for different services (e.g., for a single plugin or because separate plugins and metric collectors are instantiated for each service), then one service may be contacted at a time.

In different embodiments, the APIs exposed by the services may be HTTP APIs and/or gRPC APIs. That is, different embodiments may use exclusively HTTP APIs, exclusively gRPC APIs, or a combination of both. The HTTP APIs are exposed, e.g., as servicename/stats or a similar standard format that varies from service to service based on the service name. The gRPC APIs are exposed, e.g., as servicename.getstats( ) or a similar standard format that also varies from service to service based on the service name. In some embodiments, these APIs are protected by certificates issued by the Kubernetes cluster (e.g., by a Kubernetes controller) or by a multi-tenant service of the network management system.

Next, the process 1100 receives (at 1110) a group of messages with the metric values. In some embodiments, the metric values are provided in a uniform format, whether via API or from services that push the metric values. Specifically, some embodiments use a protocol buffer (protobuf) message format. In some such embodiments, each individual metric that a service provides to the metrics collection agent is a separate protobuf message, and each time the service provides the metrics to the metrics collection agent the service sends the messages as a group (e.g., a message bag). It should be noted that other embodiments use other message formats to provide the metrics to the metrics collection agent, such as JSON (JavaScript Object Notation), yaml (yaml ain't markup language), or xml (extensible markup language).

Figure 12:
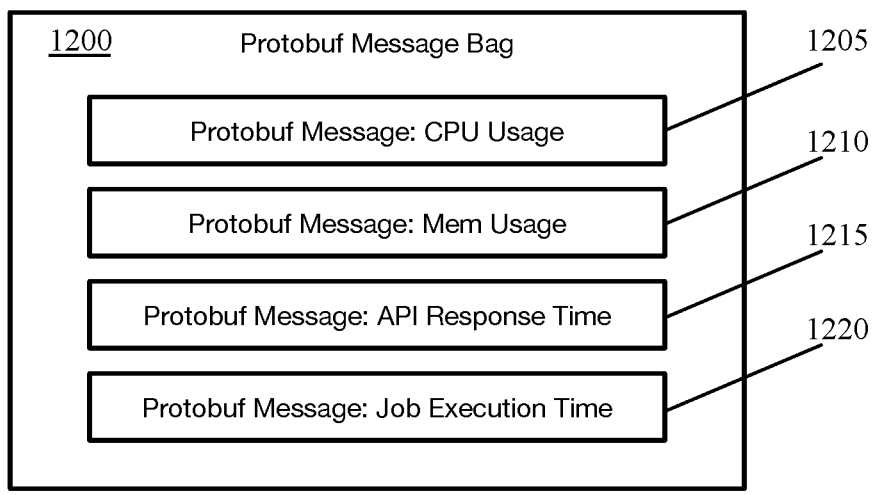
FIG. 12 conceptually illustrates a group of messages formatted as a protobuf message bag.

FIG. 12 conceptually illustrates a group of messages 1200, specifically formatted as a protobuf message bag. The message bag 1200 may be sent to the metrics collection agent either in response to an API call (either within an HTTP API payload or a gRPC response) or as a push message in order to provide metric values to the metrics collection agent. Using the message bag format allows a single response to include multiple protobuf messages that each include a metric value. In this example, the message bag 1200 includes four protobuf messages 1205-1220 that provide, for a particular service, the CPU usage, memory usage, API response time, and execution time for a specific job.

Returning to the process 1100, the process next determines, for any status metrics, whether those metrics have changed since the last metric values update. In some embodiments, the types of metrics collected can include both statistics metrics and status metrics. In FIG. 12, all four of the metric values shown are for statistics metrics. Statistics metrics provide a value for a particular feature, such as the response time (e.g., average time) for a particular API call, memory and/or CPU usage, execution time for a specific process or RPC call, etc. Status metrics, on the other hand, specify the status of a particular component or entity. For instance, these metrics may indicate whether a process or component is operating correctly, whether a connection is available, etc. Some embodiments only send status metric values to the metric monitoring service when these values change, so the agent (e.g., the plugin component of the agent) checks each status metric value to determine whether the value needs to be passed onto the metric monitoring service. To enable this check, the plugin stores the current status metric values in memory in some embodiments.

Next, the process 1100 sends (at 1120) individual messages to the metric monitoring service with the values for (i) all statistics metrics and (ii) status metrics that have changed since the last time the metric values were received. In some embodiments, while the metric values may be received in a message bag format from a service, the metrics collection agent (e.g., the exporter) sends the metric values as individual protobuf messages to the metric monitoring instance. Given that some of the metric values may be removed (i.e., the unchanged status metrics), sending individual messages allows the agent to avoid a need to repackage the metric values as a new message bag.

Finally, the process 1100 waits (at 1125) a predetermined time interval before returning to 1105 to begin the process again. In some embodiments, the process continues so long as the metrics collection agent (and the network management system) is operating. As noted, in some embodiments, each plugin performs this operation separately to collect metrics from its respective service, with the time interval dependent on the configuration for collecting metrics from that service.

Figure 13:
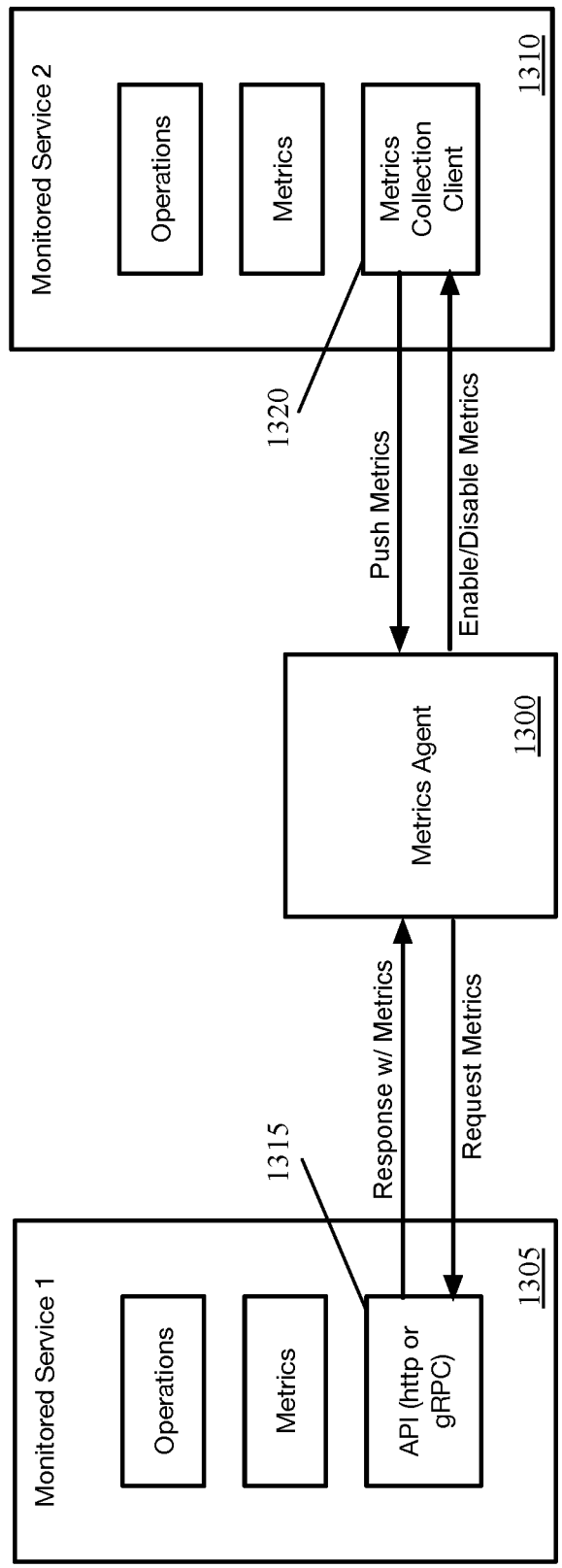
FIG. 13 conceptually illustrates the collection of metrics from two different services by a metrics collection agent.

FIG. 13 conceptually illustrates the collection of metrics from two different services 1305 and 1310 by a metrics collection agent 1300. Both of the services 1305 and 1310 operate in the same namespace (e.g., the same service instance) as the metrics agent, but the first service 1305 exposes an API for metrics collection while the second service 1310 pushes metrics to the metrics collection agent 1300. In some embodiments, each of the services 1305 and 1310 (and all of the services in the service instance) are actually implemented in the Kubernetes cluster as one or more endpoints (e.g., Pods). The metrics collection agent 1300 interacts with the endpoints via these service abstractions (e.g., to collect metrics).

Both of the services 1305 and 1310 store metrics and perform operations, with both the metrics and the operations performed depending on the type of service. For instance, for a policy manager instance, the service might perform database operations, maintain asynchronous channels with local managers at the datacenters for which the policy manager instance manages logical network policies, expose APIs to the user(s) that define the logical network policies, maintain the policy data structures, etc.

As shown, the metrics collection agent 1300 pulls metric values from the first (API-based) service 1305 by sending a request for metrics to the exposed API 1315, which may be an HTTP (or HTTPS) API or a gRPC API. In some embodiments, the metrics collection agent uses the service name (rather than the endpoint/Pod name) to send this request. In this case, the Kubernetes platform performs DNS lookups to ensure that the endpoint or endpoints receive the request. These endpoints can then respond with the current requested metric values (e.g., via protobuf messages as described above by reference to FIG. 12). In other embodiments, the metrics collection agent uses the network (IP) address (e.g., if the service uses static IP addresses) or hostname (e.g., if the service is deployed as a statefulset). As described, these metric values can include statistic metrics (e.g., resource usage, job execution time, API response time, etc.) or status metrics (e.g., connection status, job operation status, component status, etc.). It should be noted that in some embodiments, the metrics collection agent 1300 can also retrieve Pod-specific (as opposed to service-specific) metrics via the Kubernetes system API.

The second monitored service 1310 does not expose an API and instead executes a metrics collection client 1320. The service 1310 does not expose a metrics API because, e.g., the metrics are not available regularly. For instance, some metrics are only available when a job is actually running (which may not occur consistently). In some embodiments, upon startup of a service (or of a new endpoint for a service), the metrics collection client 1320 registers with the metrics collection agent 1300, opens a gRPC channel with the agent 1300, and notifies the agent 1300 of the metrics that it will provide. This allows the metrics collection agent 1300 to notify its metrics collection manager of the metrics so that the user can modify the set of metrics that should be collected. In some embodiments, the metrics collection client 1320 initially contacts the agent 1300 by using Kubernetes service discovery to discover the network address of the agent.

As shown in the figure, via this gRPC channel, the metrics collection agent 1300 sends messages to the metrics collection client 1320 of the service 1310 to enable or disable metrics (i.e., specifying which metrics should or should not be sent to the agent) based on configuration updates from the manager. In addition, the metrics collection client 1320 pushes metric values to the metrics collection agent 1300 on an as-needed basis.

It should also be noted that, in some embodiments, at least a subset of services both (i) expose an API for the metrics collection agent and (ii) execute a metrics collection client to push metrics to the metrics collection agent. In this case, regularly collectible metrics are collected by the metrics collection agent via the API while irregularly available metrics are provided to the metrics collection agent via the metrics collection client.

The above discussion relates to the collection of metrics from various service instances. In this scenario (as illustrated in, e.g., FIG. 1), the metrics collection for each group of service instances is managed separately (through the tenant user's interaction with the metrics collection manager for the group). In some embodiments, the provider of the network management system may want to (i) collect and view metrics for the common (multi-tenant) services and/or (ii) have a central management interface through which to view metrics and/or control metrics collection for some or all of the groups of service instances.

Figure 14:
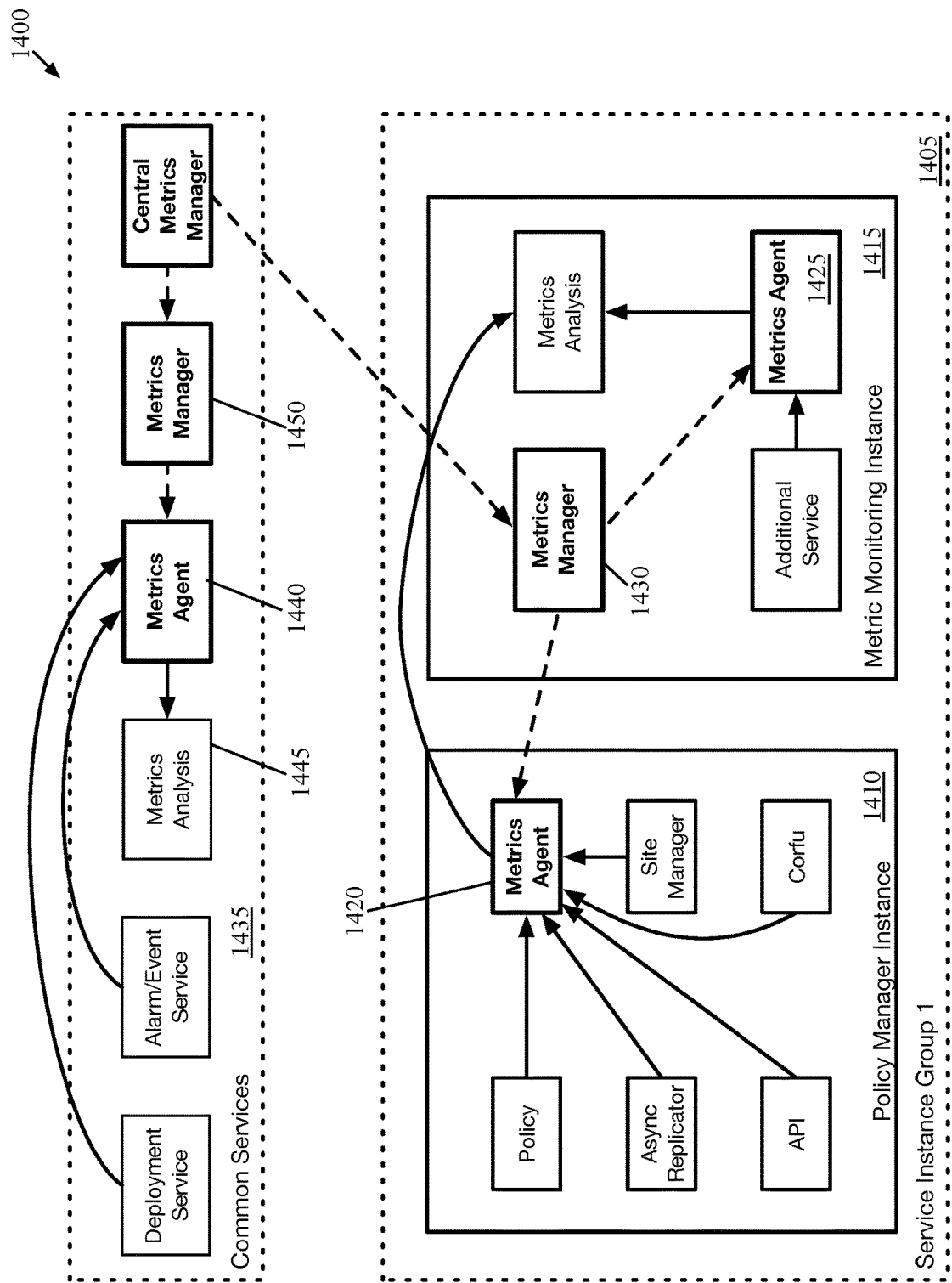
FIG. 14 conceptually illustrates the architecture of a cloud-based multi-tenant network management system of some embodiments with the metrics collection architecture expanded to include a centralized manager.

FIG. 14 conceptually illustrates the architecture of a cloud-based multi-tenant network management system 1400 of some embodiments with the metrics collection architecture expanded to include a centralized manager. In this example, only one group of service instances 1405 is shown. This group of service instances 1405 includes a policy manager instance 1410 and a metric monitoring instance 1415. Metrics collection agents 1420 and 1425 operate in each of these service instances to collect metrics from the various services that make up the service instances, while a metrics collection manager 1430 operates in the metric monitoring instance 1415. These entities operate in the manner described above.

In addition, the network management system 1400 includes common services 1435, which are deployed to their own common namespace. These services include the deployment service and an alarm and event service, as well as other services not shown in this figure (e.g., the subscription, registration, and licensing services described above by reference to FIG. 1).

The metrics collection and analysis architecture is expanded in the system 1400 to include a metrics collection agent 1440 for the common services. This metrics collection agent 1440 collects metric values (e.g., via API requests and/or push-based messages) from the various common services 1435 and provides these metric values to the metrics analysis service 1445 for analysis. The metrics analysis service 1445 performs similar metrics analysis to that performed by the metric monitoring instance 1415.

In addition, a metrics collection manager 1450 is deployed to the common services 1435 for the purpose of managing the metrics collection agent 1440. In some embodiments, this metrics manager 1450 is only accessible to administrative users of the network management system. That is, tenant users cannot view metric values or configure which metrics are collected for the common services 1435.

Some embodiments also include a central metrics manager 1455 that allows the network management system administrators/providers to centrally access metrics data and/or configure metrics collection for any of the groups of service instances. In some embodiments, such an administrator user can login to the central metrics manager 1455 and view the configuration of any metrics collection agent in the system (i.e., the common services metrics collection agent 1440, any of the metrics collection agents 1420 or 1425 for the service instance group 1405, or any metrics collection agents for any other service instance groups. Through this central metrics manager 1455, the administrator can modify these configurations, which are then provided to the appropriate metrics collection manager 1450 or 1430 via the APIs of these managers in order for the managers to configure the metrics collection agents in the manner described above.

FIG. 15 conceptually illustrates an electronic system 1500 with which some embodiments of the invention are implemented. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random-access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 7, 9, 10, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for monitoring a multi-tenant network management system deployed in a cloud to manage a plurality of groups of datacenters, the network management system comprising a plurality of groups of service instances, the method comprising:
for each respective group of service instances deployed in the cloud to manage a respective datacenter group:
deploying a metrics collection agent within each service instance, in a namespace that contains the services of the service instance, of the group of service instances to collect metrics from services of the service instance and provide the collected metrics to a metric monitoring service instance of the group of service instances, wherein the metrics collection agent communicates with the services using a namespace-local inter-process messaging channel; and
deploying a metrics collection manager within the metric monitoring service instance of the group of service instances, the metrics collection manager for configuring each of the metrics collection agents deployed within the service instances of the group of service instances.

2. The method of claim 1, wherein:
each respective datacenter group belongs to a respective tenant; and
each respective group of service instances that manages a respective datacenter group is accessible only by the respective tenant to which the respective datacenter group belongs.

3. The method of claim 2, wherein the multi-tenant network management system comprises, in addition to the plurality of groups of service instances, a set of multi-tenant services deployed in the cloud that are accessible by a plurality of the tenants.

4. The method of claim 3 further comprising:
deploying a particular metrics collection agent to collect metrics from the multi-tenant services and provide the collected metrics to a multi-tenant metric monitoring service; and
deploying a multi-tenant metrics collection manager for configuring the particular metrics collection agent.

5. The method of claim 4 further comprising deploying a central metrics manager that is accessible by the plurality of tenants to configure metric monitoring for each tenant's respective group of service instances.

6. The method of claim 3, wherein the method is performed by one of the multi-tenant services that handles deployment of service instances and the metrics collection agents in the cloud.

7. The method of claim 1, wherein:
the network management system is deployed in a Kubernetes cluster in a public cloud; and
for a particular group of service instances, each respective service instance is deployed in a different respective namespace.

8. The method of claim 7, wherein deploying a particular respective metrics collection agent within a particular service instance comprises deploying the particular metrics collection agent in the namespace of the particular service instance.

9. The method of claim 8, wherein for the particular service instance, the particular metrics collection agent and the services of the service instance share a namespace.

10. The method of claim 8, wherein deploying a particular metrics collection manager within a particular metric monitoring service instance comprises deploying the metrics collection manager in the namespace of the metric monitoring service instance.

11. The method of claim 8, wherein deploying a particular metrics collection manager for a particular group of service instances comprises deploying the metrics collection manager in a common namespace so that each of the metrics collection agents deployed to the service instances of the particular group of service instances can communicate with the particular metrics collection manager.

12. The method of claim 7, wherein:
each of the service instances of a group of service instances is deployed as a set of microservices; and
each microservice is implemented as one or more Pods in the namespace of the service instance to which the microservice belongs.

13. The method of claim 12, wherein the metrics collection agent for a particular service instance collects metrics from the Pods implementing at least a subset of the microservices of the particular service instance.

14. The method of claim 1, wherein a particular metrics collection manager for a particular group of service instances configures the metrics collection agents deployed within the service instances of the particular group of service instances through a remote procedure call (RPC) channel.

15. A non-transitory machine-readable medium storing a program which when executed by at least one processing unit deploys entities for monitoring a multi-tenant network management system that is deployed in a cloud to manage a plurality of groups of datacenters, the network management system comprising a plurality of groups of service instances, the program comprising sets of instructions for:
for each respective group of service instances deployed in the cloud to manage a respective datacenter group:
deploying a metrics collection agent within each service instance, in a namespace that contains the services of the service instance, of the group of service instances to collect metrics from services of the service instance and provide the collected metrics to a metric monitoring service instance of the group of service instances, wherein the metrics collection agent communicates with the services using a namespace-local inter-process messaging channel; and deploying a metrics collection manager within the metric monitoring service instance of the group of service instances, the metrics collection manager for configuring each of the metrics collection agents deployed within the service instances of the group of service instances.

16. The non-transitory machine-readable medium of claim 15, wherein:

each respective datacenter group belongs to a respective tenant; and each respective group of service instances that manages a respective datacenter group is accessible only by the respective tenant to which the respective datacenter group belongs.

17. The non-transitory machine-readable medium of claim 16, wherein the multi-tenant network management system comprises, in addition to the plurality of groups of service instances, a set of multi-tenant services deployed in the cloud that are accessible by a plurality of the tenants.

18. The non-transitory machine-readable medium of claim 17, wherein the program further comprises sets of instructions for:

deploying a particular metrics collection agent to collect metrics from the multi-tenant services and provide the collected metrics to a multi-tenant metric monitoring service; and deploying a multi-tenant metrics collection manager for configuring the particular metrics collection agent.

19. The non-transitory machine-readable medium of claim 18, wherein the program further comprises a set of instructions for deploying a central metrics manager that is accessible by the plurality of tenants to configure metric monitoring for each tenant's respective group of service instances.

20. The non-transitory machine-readable medium of claim 15, wherein:

the network management system is deployed in a Kubernetes cluster in a public cloud;

for a particular group of service instances, each respective service instance is deployed in a different respective namespace; and the set of instructions for deploying a particular respective metrics collection agent within a particular service instance comprises a set of instructions for deploying the particular metrics collection agent in the namespace of the particular service instance.

21. The non-transitory machine-readable medium of claim 20, wherein for the particular service instance, the particular metrics collection agent and the services of the service instance share a namespace.

22. The non-transitory machine-readable medium of claim 20, wherein the set of instructions for deploying a particular metrics collection manager within a particular metric monitoring service instance comprises a set of instructions for deploying the metrics collection manager in the namespace of the metric monitoring service instance.

23. The non-transitory machine-readable medium of claim 20, wherein the set of instructions for deploying a particular metrics collection manager for a particular group of service instances comprises a set of instructions for deploying the metrics collection manager in a common namespace so that each of the metrics collection agents deployed to the service instances of the particular group of service instances can communicate with the particular metrics collection manager.

24. The non-transitory machine-readable medium of claim 20, wherein:

each of the service instances of a group of service instances is deployed as a set of microservices;

each microservice is implemented as one or more Pods in the namespace of the service instance to which the microservice belongs; and the metrics collection agent for a particular service instance collects metrics from the Pods implementing at least a subset of the microservices of the particular service instance.

\* \* \* \* \*